United States Patent
Saltsidis et al.

(10) Patent No.: US 10,164,872 B2
(45) Date of Patent: Dec. 25, 2018

(54) EXPLICIT CONTROL OF AGGREGATION LINKS VIA IS-IS

(71) Applicant: Telefonaktiebolaget LM Ericsson (publ), Stockholm (SE)

(72) Inventors: Panagiotis Saltsidis, Stockholm (SE); János Farkas, Kecskemet (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 85 days.

(21) Appl. No.: 15/507,879

(22) PCT Filed: Sep. 3, 2015

(86) PCT No.: PCT/SE2015/050928
§ 371 (c)(1),
(2) Date: Mar. 1, 2017

(87) PCT Pub. No.: WO2016/036305
PCT Pub. Date: Mar. 10, 2016

(65) Prior Publication Data
US 2017/0295089 A1 Oct. 12, 2017

Related U.S. Application Data

(60) Provisional application No. 62/046,677, filed on Sep. 5, 2014.

(51) Int. Cl.
*H04L 12/709* (2013.01)
*H04L 12/755* (2013.01)
(Continued)

(52) U.S. Cl.
CPC .......... *H04L 45/245* (2013.01); *H04L 45/021* (2013.01); *H04L 47/125* (2013.01);
(Continued)

(58) Field of Classification Search
CPC ....... H04L 45/245; H04L 47/76; H04L 47/41; H04L 47/125; H04L 45/021; Y02D 50/30
See application file for complete search history.

(56) References Cited

U.S. PATENT DOCUMENTS 7,903,554 B1 * 3/2011 Manur .................. H04L 45/026
370/230.1
2012/0120809 A1 * 5/2012 Gero .................... H04L 43/0811
370/241.1
(Continued)

FOREIGN PATENT DOCUMENTS

CN 101674229 A 3/2010

OTHER PUBLICATIONS

Farkas, Janos; P802.1Qca—D0.1 Editor's Notes; May 15, 2013 (Year: 2013).*
(Continued)

*Primary Examiner* — Tejis Daya
(74) *Attorney, Agent, or Firm* — Nicholson De Vos Webster & Elliott, LLP

(57) ABSTRACT

A process is implemented by a network device for enabling the provisioning of explicit trees in a network by reporting link aggregation group (LAG) configuration information to a path computation element (PCE). The network device implements a LAG module and an intermediate system-intermediate system (IS-IS) module that includes an IS-IS path control and reservation module (ISIS-PCR). The process includes reporting LAG configuration by the LAG module to the IS-IS module within the network device, sending a link state protocol data unit (PDU) (LSP) with the LAG configuration in a LAG sub type length value (TLV) by the ISIS-PCR, receiving, by the IS-IS module, an explicit tree that specifies at least one virtual local area network (VLAN) identifier (VID) to an aggregation link of the LAG assignment, and translating, by the ISIS-PCR module, the
(Continued)

explicit tree into a LAG configuration, the LAG configuration specifying a conversation to aggregation link assignment.

25 Claims, 12 Drawing Sheets

(51) Int. Cl.
*H04L 12/803* (2013.01)
*H04L 12/891* (2013.01)
*H04L 12/917* (2013.01)

(52) U.S. Cl.
CPC .............. *H04L 47/41* (2013.01); *H04L 47/76* (2013.01); *Y02D 50/30* (2018.01)

(56) References Cited

U.S. PATENT DOCUMENTS

2013/0301472 A1* 11/2013 Allan .................. H04L 45/66
370/254
2014/0269266 A1* 9/2014 Filsfils .................. H04L 43/50
370/228
2015/0304127 A1* 10/2015 Xiao .................. H04L 12/465
370/254

OTHER PUBLICATIONS

Farkas et al.; Explicit Control of Aggregation Links via IS-IS; Sep. 9, 2014 (Year: 2014).*
Farkas et al.; 802.1Qca—PCRA Proposal; Jan. 15, 2013 (Year: 2013).*
Farkas, Janos; SRP—IS-IS Interworking; Jul. 16, 2013 (Year: 2013).*
Disposition of Task Group Ballot Comments on IEEE Draft P802.1Qca/D0.4 "Bridges and Bridged Networks—Amendment: Path Control and Reservation," LAN MAN Standards Committee of the IEEE Computer Society, Dec. 16, 2013, 34 pages.
Draft Standard for Local and Metropolitan Area Networks "Link Aggregation", IEEE P802.1AX-REV™/D4.3, LAN MAN Standards Committee of the IEEE Computer Society, Jul. 2014, 320 pages.
Farkas J., "Description of Explicit Topologies," IEEE 802 LAN/MAN Standards Committee IEEE, Mar. 27, 2014, pp. 1-26. Retrieved from the Internet: URL:http://www.ieee802.org/1/files/public/docs2014/ca-farkas-topology-description-0314-v02.pdf [retrieved on Dec. 11, 2015].
Farkas J., "P802.1Qca D0.8 Tutorial—Explicit Path Control" IEEE 802 LAN/MAN Standards Committee, Jul. 15, 2014, pp. 1-35. Retrieved from the Internet: URL:http://www.ieee802.org/1/files/public/docs2014/ca-farkas-d0-8-tutorial-0714-v02.pdf [retrieved on Dec. 11, 2015].
Farrel., et al., "A Path Computation Element (PCE)-Based Architecture," Network Working Group Request for Comments 4655, Aug. 2006, 40 pages.
Ginsberg L., et al., "Advertising L2 Bundle Member Link Attributes in IS-IS draft-ginsberg-isis-l2bundles-00.txt" Networking Working Group, Jul. 6, 2015, 12 pages.
Heinrich Hummel et al., "Explicit Tree Routing; draft-hummel-mpls-explicit-tree-01.txt" MPLS Working Group, No. 1, Jun. 30, 1999, 17 pages.
IEEE Computer Society "Media Access Control (MAC) Bridges and Virtual Bridged Local Area Networks—Amendment 20: Shortest Path Bridging," LAN/MAN Standards Committee, IEEE Std 802.1aq™-2012, 2012, 340 pages.
IEEE P802.1Qca/D04 "Bridges and Bridged Networks— Amendment: Path Control and Reservation," LAN/MAN Standards Committee of the IEEE Computer Society, Oct. 2013, 48 pages.
IEEE P802.1 Qca/D1.0; Draft Standard for Local and metropolitan area networks, "Bridges and Bridged Networks—Amendment: Path Control and Reservation," LAN/MAN Standards Committee of the IEEE Computer Society, Aug. 2014, 119 pages.
IEEE standard for Local and Metropolitan Area Networks "Link Aggregation", LAN/MAN Standard Committee, IEEE Std 802.1AX-2008, 2008, 162 pages.
ISO/IEC 10589:2002(E), "Information Technology—Telecommunications and Information Exchange Between Systems— Intermediate System to Intermediate System Intra-Domain Routeing Information Exchange Protocol for use in Conjunction with the Protocol for Providing the Connectionless-Mode Network Service (ISO 8473)," International Standard, Second edition Nov. 15, 2002, 210 pages.
RFC 1058: Hedrick C., "Routing Information Protocol," 1988, 33 pages, Network Working Group, Request for Comments: 1058.
RFC 1142: Oran, "OSI IS-IS Intra-domain Routing Protocol," Feb. 1990, 157 pages, Network Working Group, Request for Comments: 1142.
RFC 1180: Socolofsky T., et al., "A TCP/IP Tutorial," 1991, 28 pages, Network Working Group, Request for Comments: 1180.
RFC 2080: Malkin., et al., "RIPng for IPv6," Jan. 1997, 19 pages, Network Working Group, Request for Comments: 2080.
RFC 2205: Braden R., et al., "Resource ReSerVation Protocol (RSVP) Version 1 Functional Specification," 1997, 112 pages, Network Working Group, Request for Comment: 2205.
RFC 2210: Wroclawski J., "The Use of RSVP with IETF Integrated Services," 1997, 33 pages, Network Working Group, Request for Comments: 2210.
RFC 2211: Wroclawski J., "Specification of the Controlled-Load Network Element Service," 1997, 19 pages, Network Working Group, Request for Comments: 2211.
RFC 2212: Shenker., et al., "Specification of Guaranteed Quality of Service," 1997, 20 pages, Network Working Group, Request for Comments: 2212.
RFC 2328: Moy J.T., "OSPF Version 2," 1998, 244 pages, Standards Track, downloaded on Mar. 17, 2009, http://rfc.dotsrc.org/rfc/rfc2328.html,Request for comments: 2328.
RFC 2453: Malkin, et al., "RIP Version 2," Nov. 1998, 39 pages, Network Working Group, Request for Comments: 2453.
RFC 2460: Deering S., et al., "Internet Protocol Version 6 (IPv6)," 1998, 39 pages, Network Working Group, Standards Track, Request for comments: 2460.
RFC 2474: Nichols K., "Definition of the Differentiated Services Field (DS Field) in the IPv4 and IPv6 Headers," 1998, 20 pages, Network Working Group, The Internet Society, Request for Comments: 2474.
RFC 2475: Blake S., "An Architecture for Differentiated Services," 1998, 36 pages, Network Working Group, The Internet Society, Request for Comments: 2475.
RFC 2597: Heinanen J., et al., "Assured Forwarding PHB Group," 1999, 11 pages, The Internet Society, Request for comments: 2597.
RFC 2675: Borman D., "IPv6 Jumbograms," 1999, 9 pages, Network Working Group, The Internet Society, Request for Comments: 2675.
RFC 2983: Black D., "Differentiated Services and Tunnels," 2000, 14 pages, Network Working Group, The Internet Society, Request for Comments: 2983.
RFC 3086: Nichols K., et al., "Definition of Differentiated Services Per Domain Behaviors and Rules for their Specification," 2001, 24 pages, Network Working Group, Request for Comments: 3086.
RFC 3140: Black D., et al., "Per Hop Behavior Identification Codes," 2001, 8 pages, Network Working Group, Standards Track, Request for Comments: 3140.
RFC 3209: Awduche D., et al., "RSVP-TE: Extensions to RSVP for LSP Tunnels," 2001, 61 pages, Network Working Group, The Internet Society, Request for Comments: 3209.
RFC 3246: Davie B., et al., "An Expedited Forwarding PHB (Per-Hop Behavior)," 2002, 16 pages, The Internet Society, Request for Comments: 3246.
RFC 3247: Charny A., et al., "Supplemental Information for the New Definition of the EF PHB (Expedited Forwarding Per-Hop Behavior)," 2002, 24 pages, Network Working Group, The Internet Society, Request for Comments 3247.

(56) References Cited

OTHER PUBLICATIONS

RFC 3260: Grossman D., "New Terminology and Clarifications for Diffserv," 2002, 10 pages, Network Working Group, The Internet Society, Request for Comments: 3260.
RFC 3277: McPherson D., "Intermediate System to Intermediate System (IS-IS) Transient Blackhole Avoidance," Network Working Group, RFC 3277, 2002, pp. 6.
RFC 3289: Baker F., et al., "Management Information Base for the Differentiated Services Architecture," 2002, 116 pages, Network Working Group, The Internet Society, Request for Comments: 3289.
RFC 3290: Bernet Y., et al., "An Informal Management Model for Diffserv Routers," 2002, 56 pages, Network Norking Group, The Internet Society, Request for Comments: 3290.
RFC 3317: Chan K., et al., "Differentiated Services Quality of Service Policy Information Base," 2003, 96 pages, Network Working Group, The Internet Society, Request for Comments: 3317.
RFC 3473: Berger L., "Generalized Multi-Protocol Label Switching (GMPLS) Signaling Resource ReserVation Protocol-Traffic Engineering (RSVP-TE) Extensions," 2003, 42 pages, The Internet Society, Network Working Group, Request for Comments: 3473.
RFC 3936: Kompella., et al., "Procedures for Modifying the Resource reSerVation Protocol (RSVP)," 2004, 7 pages, The Internet Society, Network Working Group, Request for Comments: 3936.
RFC 4113: Fenner B., et al., "Management Information Base for the User Datagram Protocol (UDP)," 2005, 19 pages, Network Working Group, The Internet Society, Request for Comments: 4113.
RFC 4271: Rekhter Y., et al., "A Border Gateway Protocol 4 (BGP-4)," 2006, 104 pages, The Internet Society, Request for Comments: 4271.
RFC 4301: Kent S., et al., "Security Architecture for the Internet Protocol," Dec. 2005, 101 pages, The Internet Society, Network Working Group, Request for Comments: 4301.
RFC 4309: Housley., "Using Advanced Encryption Standard (AES) CCM Mode with IPsec Encapsulating Security Payload (ESP)," 2005, 13 pages, The Internet Society, Network Working Group, Request for Comments: 4309.
RFC 4364: Rosen, et al., "BGP/MPLS IP Virtual Private Networks (VPNs)," Feb. 2006, 47 pages, The Internet Society, Network Working Group, Request for Comments: 4364.
RFC 4495: Polk., et al., "A Resource Reservation Protocol (RSVP) Extension for the Reduction of Bandwidth of a Reservation Flow," 2006, 21 pages, The Internet Society, Network Working Group, Request for Comments: 4495.
RFC 4558: Ali., et al., "Node-ID Based Resource Reservation Protocol (RSVP) Hello: A Clarification Statement," 2006, 7 pages, Network Working Group, The Internet Society, Request for Comments: 4558.
RFC 4594: Babiarz J., et al., "Configuration Guidelines for DiffServ Service Classes," 2006, 57 pages, Network Norking Group, Request for Comments: 4594.
RFC 5036: Andersson L., "LDP Specification," 2007, 135 pages, The EITF Trust, Network Working Group, Request or Comments: 5036.
RFC 5340: Coltun R., et al., "OSPF for IPv6," 2008, 94 pages, The IETF Trust, Network Working Group, Request for Comments: 5340.
RFC 5405: Eggert L., et al., "Unicast UDP Usage Guidelines for Application Designers," 2008, 27 pages, Network Norking Group, IETF Trust, Request for Comments: 5405.
RFC 5865: Baker F., "A Differentiated Services Code Point (DSCP) for Capacity-Admitted Traffic," May 2010, 14 pages, Internet Engineering Task Force (IETF), IETF Trust, Request for Comments: 5865.
RFC 768: Postel, "User Datagram Protocol," Aug. 28, 1980, 3 pages, Network Working Group, Request for Comments: 768.
RFC 791: Postel, "DARPA Internet Program Protocol Specification," Sep. 1981, 50 pages, Request for comments: 791.
RFC 793: Postel J., "Transmission Control Protocol," Sep. 1981, 91 pages, DARPA Internet Program Protocol Specification, Request for comments: 793.

\* cited by examiner

LAG sub-TLV

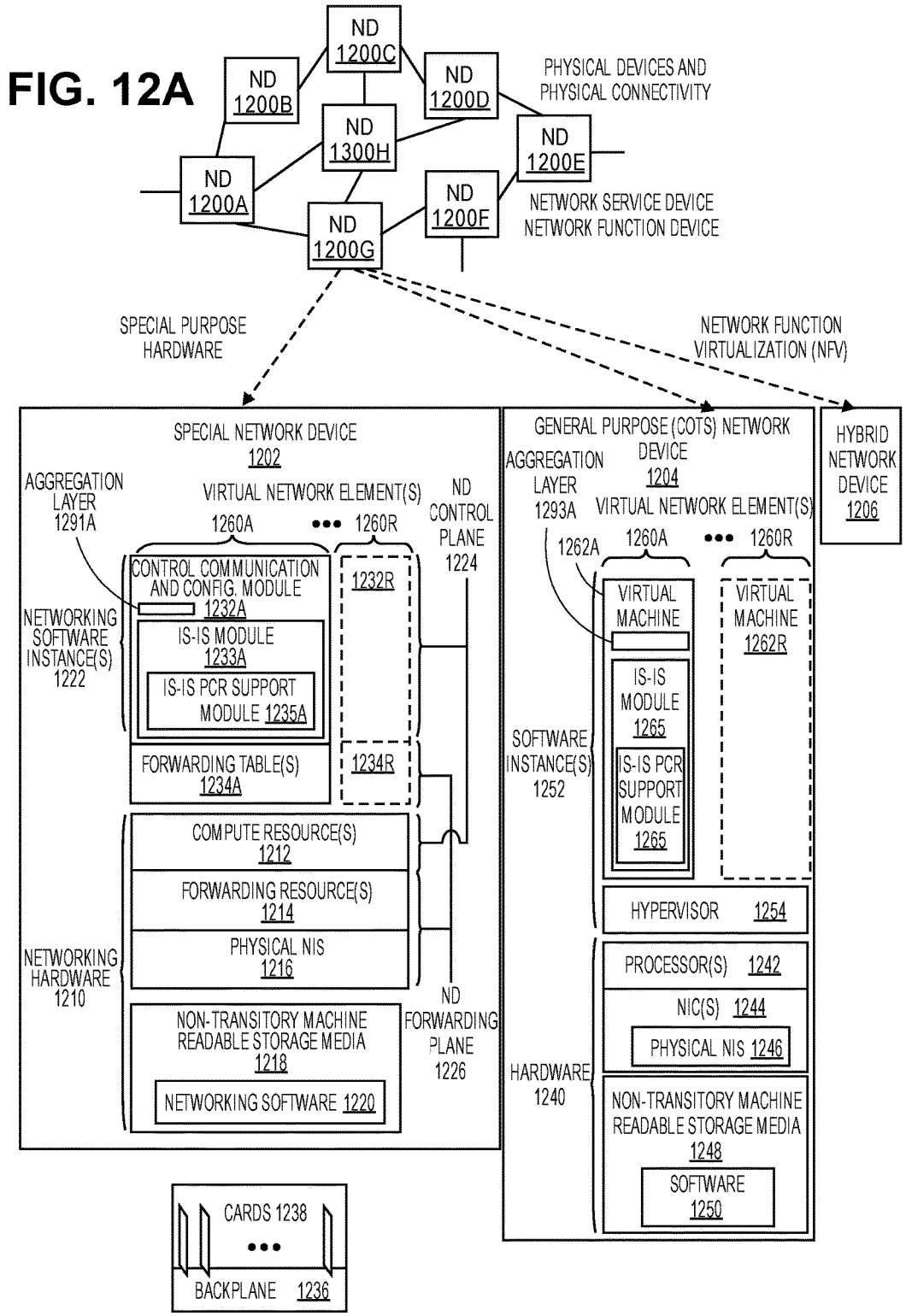

EXPLICIT CONTROL OF AGGREGATION LINKS VIA IS-IS

CROSS-REFERENCE TO RELATED APPLICATIONS

This application is a National stage of International Application No. PCT/SE2015/050928, filed Sep. 3, 2015, which claims priority to U.S. Provisional Application No. 62/046,677, filed Sep. 5, 2014, which are hereby incorporated by reference.

FIELD

Embodiments of the invention relate to the field of link aggregation group (LAG) and explicit path control and reservation in a network domain. More specifically, the embodiments relate to a process for establishing explicit trees that incorporate the specifics of LAGs in a network domain enabling the establishment of an explicit tree that identifies a particular LAG link as a part of the explicit tree.

BACKGROUND

Link Aggregation Groups

As illustrated in FIG. 1A, link aggregation is a network configuration and process used to aggregate multiple links between a pair of nodes 120, 122 in the network to enable transmission of user data on each of the links participating in a Link Aggregation Group (LAG) 101 (see, e.g., Institute of Electrical and Electronics Engineers (IEEE) standard 802.1AX herein after referred to as IEEE 802.1AX-2008). Aggregating multiple network connections in this fashion can increase throughput beyond what a single connection can sustain, and/or can be used to provide resiliency in case of a failure of one of the links. The Conversation-sensitive frame collection and distribution (see subclause 6.6 of IEEE P802.1AX-REV™/D4.3, entitled "Draft Standard for Local and Metropolitan Area Networks-Link Aggregation," dated Jul. 21, 2014, which is incorporated by reference in its entirety within) specifies extensions to link aggregation in order to be able to select which aggregation link a conversation is carried over. The "Distributed Resilient Network Interconnect" (DRNI) 102 (see Clause 8 of IEEE P802.1AX-REV™/D4.3, entitled "Draft Standard for Local and Metropolitan Area Networks-Link Aggregation," dated Jul. 1, 2014, which is incorporated by reference in its entirety within) specifies extensions to link aggregation in order to be able to use link aggregation on a network interface even between more than two nodes, for example between four nodes K, L, M and O as illustrated in FIG. 1B.

As shown in FIG. 1B, a LAG is formed between Network 150 and Network 152. More specifically, a LAG is formed between LAG virtual nodes or "portals" 112, 114. The first LAG virtual node or portal 112 includes a first node (K) and a second node (L). The second LAG virtual node or portal 114 includes a third node (M) and a fourth node (O). These nodes can also be referred to as "Portal Systems." Note that both the first and second LAG virtual nodes or portals 112, 114 may include a single or more than two nodes in a portal. LAG Nodes K and M are connected as peer nodes, and LAG Nodes L and O are also connected as peer nodes.

FIG. 1B also shows a DRNI link allocation of a particular service (see bold link between K and M in FIG. 1B). The allocated link is the working link between two working nodes K and M for the particular service, while the unallocated link may be provisioned as the protection link between two protection nodes L and O. The service allocation of an interface may involve a Virtual Local Area Network (VLAN), and an identifier for the service may be a VLAN Identifier (VID), such as a Service VID (i.e., "S-VID") (typically identifying services on Network to Network Interfaces (NNIs)) or a Customer VID (i.e. "C-VID") (typically identifying services on User to Network Interfaces (UNIs)). (Note that backbone-VIDs are indistinguishable from S-VIDs as they have the same Ethertype.) In the example of FIG. 1B, the service is allocated to the upper link (between upper nodes K, M). The upper link is thus chosen as the "working" link and the lower link (between nodes L, O) is the "standby" link or "protection" link. Service link allocation, i.e. using the same physical link for frame transmission both in the forward and in the backward directions is highly desirable.

While FIG. 1B shows DRNI portals 112 and 114 each contain two nodes, DRNI portals are not so limited. Each portal may contain one to three nodes. FIG. 1C illustrates a DRNI in an alternate embodiment. Referring to FIG. 1C, link aggregation group 131 contains portal 142 (one network device 130) at one end, and portal 144 (two network devices 132 and 134) at the other end. Also note that FIG. 1C shows a DRNI link allocation of a particular service (see bold link between network devices 130 and 134). The allocated link is the working link between two working nodes (network devices 130 and 134) for the particular service, while the unallocated link may be provisioned as the protection link between two protection nodes (network devices 130 and 132). The working node is a single node in this configuration, but it may contain different sets of aggregation ports for connecting the working and protection links between the portals 142 and 144.

Routing and Link State Control Protocols

Link-state control protocols, such as the Intermediate System to Intermediate System (IS-IS) or the Open Shortest Path First (OSPF), are distributed protocols that are most often used for the control of data packet routing and forwarding within a network domain. Link state protocols are executed by each node and collect information about the adjacent neighbor nodes of the node by exchanging Hello protocol data units (PDUs) with the adjacent neighbor nodes. The nodes then distribute the information about their neighbors by means of flooding Link-state PDUs (LSP) or Link State Advertisements (LSA) into the network domain. Thus, each node maintains a link state database (LSDB) based on the received LSPs or LSAs and the LSDB is identical in each node of a converged network domain. A topology database is retrieved from the LSDB, which stores the network domain topology Each node then determines a path to each of the possible destination nodes in the topology on its own, which is typically the shortest path often referred to as Shortest Path First. Each node then sets its local forwarding entry to the port through which a given destination node is reachable according to the result of the path computation (i.e., the shortest path). This mechanism ensures that there will be a shortest path set up between any pair of nodes in the network domain.

Shortest Path Bridging (SPB) (IEEE 802.1aq, 2012) specifies extensions to IS-IS for the control of bridged Ethernet networks. SPB is a form of add-on to IS-IS (ISIS, (International Standards Organization (ISO)/International Electrotechnical Commission (EIC) 10589, 2002) by defining new type/length/values (TLVs) and the relevant operations. That is, the existing IS-IS features have been kept, but some new features were added for control over Ethernet.

SPB uses shortest paths for forwarding and is also able to leverage multiple shortest paths.

The IEEE 802.1Qca draft D1.0 (IEEE 802.1Qca, 2013, referred to herein as IEEE 8021Qca) defines an explicit tree (also referred to as an explicit forwarding tree) as a set of hops, where each hop defines the next node over which a path must be routed, the Topology sub-TLV of 802.1Qca provides a structure for describing an explicit tree and for conveying the explicit tree using LSPs or LSAs into a network domain. An explicit tree can be utilized to describe a point to point path and used in place of a shortest path to define a path between a node pair in the network domain. The explicit tree can also be a multipoint-to-multipoint path and used in place of a shortest path tree to define a tree among a set of nodes in the network domain. As used herein, an explicit tree is generic to all types of paths, including point to point paths and multipoint paths, with an explicit path referring to point to point paths. The Topology sub-TLV is disseminated making use of IS-IS, i.e. flooded in an LSP throughout the network domain. All nodes, upon receiving this advertisement are able to install the necessary forwarding entries thus an end-to-end explicit tree or path is formed. Then, all nodes, as a result of the local configuration, generate a second advertisement that disseminates the result of the path configuration. Then any system connected to the Ethernet network, including a Path Computation Element (PCE), is able determine whether the path has been successfully installed or the configuration has failed.

However, a limitation of path determination in a network domain is that the existence and characteristics of LAGs are not included in the information provided by LSPs because IS-IS does not provide a mechanism for sharing LAG configuration and the IS-IS modules implementing the protocol at each node in the network do not have information regarding LAG configuration, because the IS-IS neighbor discovery process (i.e., the exchange of Hello PDUs) does not interact with the link aggregation layer. As a result, an explicit tree or path cannot be specified to utilize a particular link in a LAG.

SUMMARY

In one embodiment, a process is implemented by a network device for enabling the provisioning of explicit trees in a network by reporting link aggregation group (LAG) configuration information to a path computation element (PCE). The network device implementing a LAG module and an intermediate system intermediate system (IS-IS) module including an IS-IS path control and reservation module (ISIS-PCR). The process includes reporting LAG configuration by the LAG module to the IS-IS module within the network device, sending a link state protocol data unit (PDU) (LSP) with the LAG configuration in a LAG sub type length value (TLV) by the ISIS-PCR, receiving, by the IS-IS module, an explicit tree that specifies at least one virtual local area network (VLAN) identifier (VID) to an aggregation link of the LAG assignment, and translating, by the ISIS-PCR module, the explicit tree into a LAG configuration, the LAG configuration specifying a conversation to aggregation link assignment.

In another embodiment, a non-transitory computer readable medium has instructions stored therein defining a method to be implemented by a network device for enabling the provisioning of explicit trees in a network by reporting link aggregation group (LAG) configuration information to a path computation element (PCE). The network device implements a LAG module and an intermediate system intermediate system (IS-IS) module including an IS-IS path control and reservation module (ISIS-PCR). The instructions when executed by a processor of the network device cause a set of operations to be performed. The operations include reporting LAG configuration by the LAG module to the IS-IS module within the network device, sending a link state protocol data unit (PDU) (LSP) with the LAG configuration in a LAG sub type length value (TLV) by the ISIS-PCR, receiving, by the IS-IS module, an explicit tree that specifies at least one virtual local area network (VLAN) identifier (VID) to an aggregation link of the LAG assignment, and translating, by the ISIS-PCR module, the explicit tree into a LAG configuration, the LAG configuration specifying a conversation to aggregation link assignment.

In one embodiment, a network device implements a method for enabling the provisioning of explicit trees in a network by reporting link aggregation group (LAG) configuration information to a path computation element (PCE). The network device implements a LAG module and an intermediate system intermediate system (IS-IS) module including an IS-IS path control and reservation module (ISIS-PCR). The network device includes a non-transitory computer-readable medium having stored therein an intermediate system to intermediate system module including an IS-IS path control and reservation (ISIS-PCR) module and a LAG module, and a processor coupled to the non-transitory computer-readable medium. The processor is configured to execute the IS-IS module and the LAG module. The LAG module is configured to report LAG configuration by the LAG module to the IS-IS module within the network device. The ISIS-PCR module is configured to send a link state protocol data unit (PDU) (LSP) with the LAG configuration in a LAG sub type length value (TLV). The IS-IS module is configured to receive an explicit tree that specifies at least one a virtual local area network (VLAN) identifier (VID) to an aggregation link of the LAG assignment. The ISIS-PCR module is further configured to translate the explicit tree into a LAG configuration, the LAG configuration specifying a conversation to aggregation link assignment.

In one embodiment, a computing device is configured to execute a plurality of virtual machines for implementing network function virtualization (NFV), wherein a virtual machine from the plurality of virtual machines is configured to execute a method for enabling the provisioning of explicit trees in a network by reporting link aggregation group (LAG) configuration information to a path computation element (PCE). The computing device includes a non-transitory computer-readable medium having stored therein an intermediate system to intermediate system module including an IS-IS path control and reservation (ISIS-PCR) module and a LAG module, and a processor coupled to the non-transitory computer-readable medium. The processor is configured to execute the virtual machine. The virtual machine executes the IS-IS module and the LAG module. The LAG module is configured to report LAG configuration by the LAG module to the IS-IS module within the network device. The ISIS-PCR module is configured to send a link state protocol data unit (PDU) (LSP) with the LAG configuration in a LAG sub type length value (TLV). The IS-IS module is configured to receive an explicit tree that specifies at least one virtual local area network (VLAN) identifier (VID) to an aggregation link of the LAG assignment, and the ISIS-PCR module is further configured to translate the explicit tree into a LAG configuration, the LAG configuration specifying a conversation to aggregation link assignment.

In one embodiment, a control plane device implements a control plane of a software defined networking (SDN) network including a plurality of network devices. The control plane device implements a method for enabling the provisioning of explicit trees in a network by reporting link aggregation group (LAG) configuration information to a path computation element (PCE). The control plane device includes a non-transitory computer-readable medium having stored therein an intermediate system to intermediate system module including an IS-IS path control and reservation (ISIS-PCR) module and a LAG module, and a processor coupled to the non-transitory computer-readable medium, the processor configured to execute the IS-IS module and the LAG module, the LAG module configured to report LAG configuration by the LAG module to the IS-IS module within the network device, the ISIS-PCR module configured to send a link state protocol data unit (PDU) (LSP) with the LAG configuration in a LAG sub type length value (TLV), the IS-IS module configured to receive an explicit tree that specifies at least one assignment of a virtual local area network (VLAN) identifier (VID) to an aggregation link of the LAG assignment, and the ISIS-PCR module further configured to translate the explicit tree into a LAG configuration, the LAG configuration specifying a conversation to aggregation link assignment.

BRIEF DESCRIPTION OF THE DRAWINGS

The invention may best be understood by referring to the following description and accompanying drawings that are used to illustrate embodiments of the invention. In the drawings:

FIG. 12A illustrates connectivity between network devices (NDs) within an exemplary network, as well as three exemplary implementations of the NDs, according to some embodiments of the invention.

FIG. 12B illustrates an exemplary way to implement the special-purpose network device 1202 according to some embodiments of the invention.

DESCRIPTION OF EMBODIMENTS

Figure 1A:
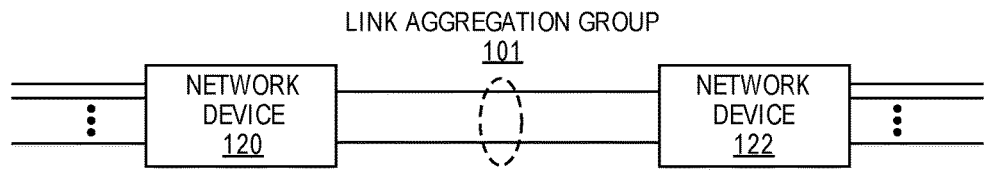
FIG. 1A is a diagram of one embodiment of a Link Aggregation Group between two network devices.
Figure 1B:
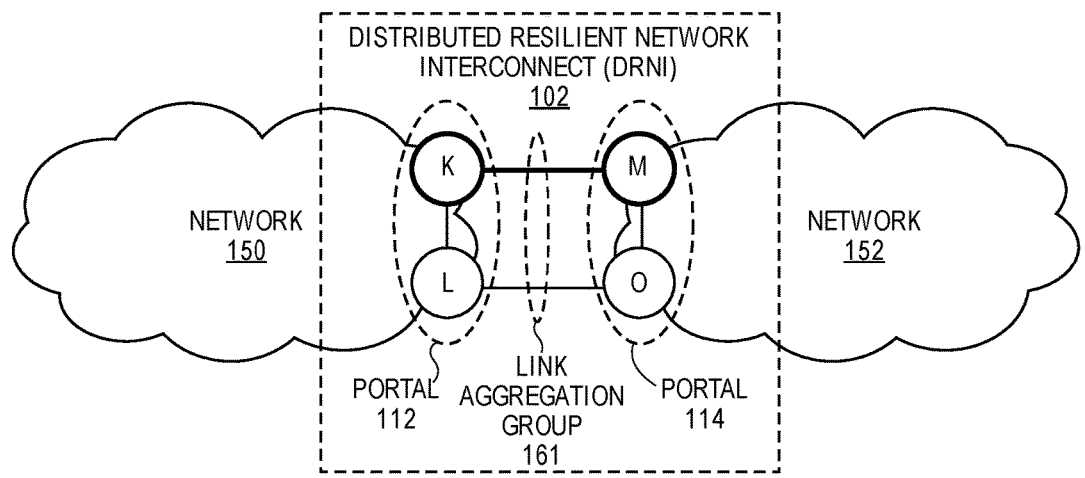
FIG. 1B is a diagram of one embodiment of two Portals connecting two networks via a Link Aggregation Group.
Figure 1C:
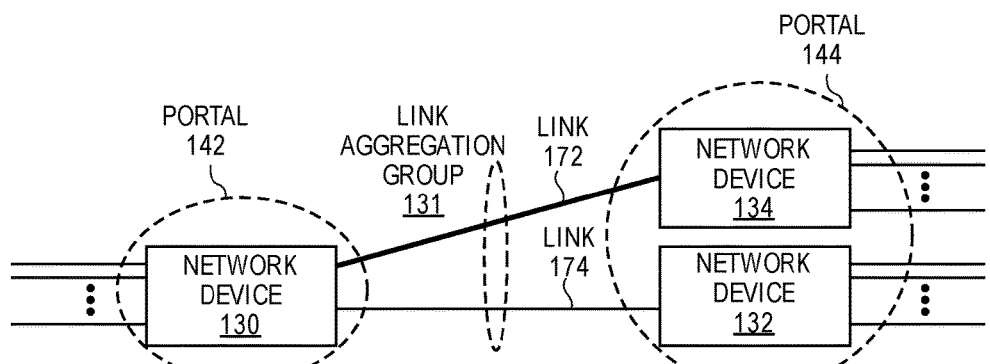
FIG. 1C is a diagram of another embodiment of two Portals connecting two networks via a Link Aggregation Group.

The following description describes methods and apparatus for providing explicit control of aggregation links (i.e., a set of links of a link aggregation group) via IS-IS referred to as IS-IS PCR. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Terms

The following terms may be used in the description.

Conversation: A set of frames transmitted from one device to another, where all the frames form an ordered sequence, and where the communicating devices require the ordering to be maintained among the set of frames exchanged.

Conversation ID: An identifier using values (for example, in the range of 0 4095) to identify conversations.

Link Aggregation Group (LAG): A group of links that appear to an Aggregator Client as if they were a single link. A Link Aggregation Group can connect two Aggregation Systems, an Aggregation System and a Portal, or two Portals. One or more conversations may be associated with each link that is part of a Link Aggregation Group.

Type/Length/Value (TLV): A short, variable length encoding of an information element consisting of sequential type, length, and value fields where the type field identifies the type of information, the length field indicates the length of the information field in octets, and the value field contains the information itself. The type value is locally defined and needs to be unique within the protocol defined in this standard.

Explicit Trees and the Topology Sub-TLV

As mentioned herein above, an explicit tree or explicit forwarding tree defines a set of hops for forwarding data along a point to point or multipoint to multipoint path between any number of nodes. The explicit tree can be calculated by a path computation element and described using a Topology sub-TLV that is part of an IS-IS LSP or LSA, which is flooded into a network domain to cause the nodes identified by the Topology sub-TLV to configure their forwarding tables to forward data traffic for an identified session or conversation according to the explicit tree. The topology sub-TLV, described in clause 45.1.9 of 802.1Qca D1.0) carries all attributes that are required to provision an explicit tree in an Ethernet network.

Path Computation Element

According to IEEE 802.1Qca, an entity, referred to as a Path Computation Element (PCE), constructs an explicit tree and disseminates this descriptor using IS-IS. The PCE is defined in Internet Engineering Task Force (IETF) request for comment (RFC) 4655. The PCE is an entity that is capable of computing a topology for forwarding based on a given network topology, corresponding attributes and potential constraints. A network domain can include a single PCE or multiple PCEs. A PCE can reside either external to the network domain or can be present at a node such as an endpoint node internal to the network domain. The PCE interacts with the topology discovery and routing protocol and/or the topology control protocol such as IS-IS (or the IS-IS path control and reservation (PCR) protocol). In one embodiment, a path control agent (PCA) can enable the collaboration with an ISIS-PCR where the PCA is an independent component that is part of the IS-IS network domain and thus can perform IS-IS operations in charge of a PCE, e.g. maintain LSDB and send LSPs. For computing the explicit trees, the PCE has access to link state topology information such as that stored in a link state topology database or similar data resource. An explicit tree can be associated with particular virtual local area network (VLAN) identifiers (VIDs) or media access control (MAC) addresses for associating the explicit trees with particular data traffic and services.

Either the PCE or the corresponding PCA is part of the network domain. If the PCE is not part of the network domain, then the PCE has to be associated with a PCA that resides either in a bridge or other network device directly connected to at least one other bridge or network device in the network domain. The PCE or its PCA establishes IS-IS adjacency in order to receive all the LSPs transmitted by the network devices in the network domain. The PCE, either on its own or via its PCA, can control the establishment of explicit trees in the network domain by means of injecting an LSP conveying an explicit tree and thus instruct ISIS-PCR to set up the explicit tree determined by the PCE. Each PCE, whether located in a bridge or other network device has access to the link state topology and resource information common throughout the network domain.

If the PCE is part of the network domain, then the PCE uses IS-IS PDUs to communicate with the nodes of the network domain and the PCE has a live IS-IS LSDB, (i.e. the PCE implements the PCA functions too). A PCE can instead communicate with the network domain via a PCA, e.g. retrieve the LSDB or instruct the creation of an explicit tree. Any means of communication between the PCE and the PCA can be employed. A PCE can also operate on a network topology retrieved by other means, e.g. configuration, instead of retrieving it from a live IS-IS LSDB. Having no live LSDB, the PCE instructs its PCA to flood the LSP conveying the appropriate Topology sub-TLV.

Figure 2:
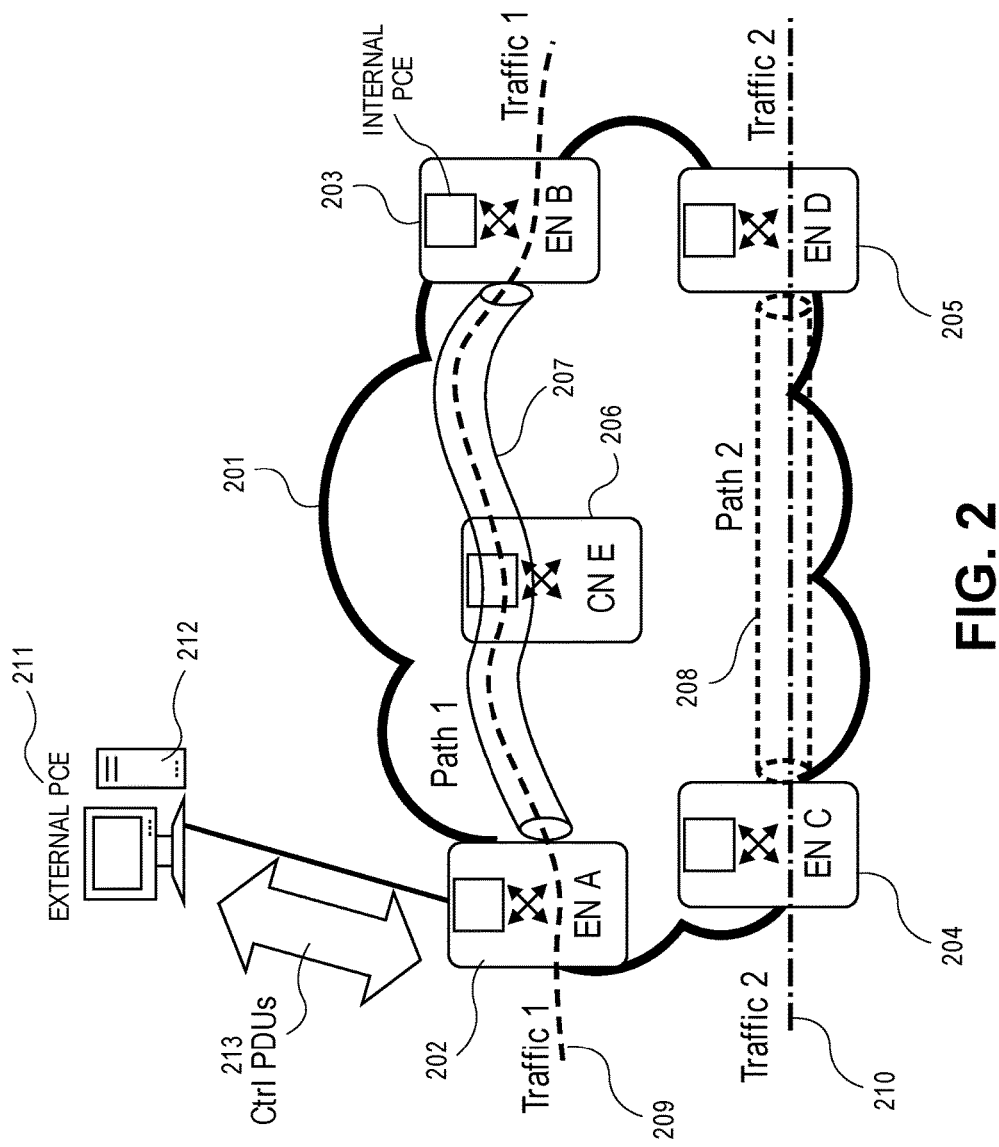
FIG. 2 is a diagram of one embodiment of a network domain including a PCE.

FIG. 2 is an example diagram of one embodiment of an Ethernet network over which an explicit path is provisioned. The illustrated network is simplified for sake of clarity, however one skilled in the art would understand the principles and structures can be applied in larger scale and more complex networking domains.

A network 201 includes a set of network devices 202-206, which can be Ethernet switches or similar devices as defined further herein below. The network devices 202-206 can be in communication with one another using over any number of combination of links, such as Ethernet links here illustrated as the cloud 201. An explicit tree can be defined to traverse this network 201 and the constituent network devices 2-2-206 such that data traffic assigned to the explicit tree will enter the network 201 at a first endpoint handled by network device 202 and will exit the network 201 at a second endpoint handled by network device 203. The explicit tree can traverse any number of intermediate network devices 206 within the network 201. The explicit path 207 can be uni-directional or bi-directional, where traffic traverses the network in one direction or in both directions across the explicit tree. In the illustrated example, the first explicit tree includes an intermediate network device 206 while other network devices 204, 205 are not included in the first explicit tree. In other embodiments, an explicit tree can have branches to additional endpoints such as the endpoint at network devices 204, 205.

The explicit tree generation and configuration can be managed by the PCE. The PCE can be implemented by any network device within the network 201 or can be implemented by any computing device 212 in communication with the network devices 202-206 of the network 200. In the illustrated example, the PCE 211 is executed by an external computing device 212, which is in communication with the network devices 202-206 and can generate control PDUs that are sent to a network device of network 201 which in turn forwards the explicit tree information (e.g., in a Topology sub-TLV) to several other network devices, which in turn forward the explicit tree information to additional network devices such that all network devices 202-206 receive the explicit tree. Each network device examines the explicit tree information and configures the explicit tree traffic forwarding and related management. The explicit tree information can be a sub-TLV that is carried within an OSPF link state advertisement (LSA) or in an IS-IS link state PDU (LSP). The PCE can also be an internal PCE implemented at any of the network devices e.g., network device 203. Multiple explicit paths can be specified by the PCE including a first path 207 and second path 208 to forward traffic 209 and 210, respectively.

IS-IS Architecture

Figure 3:
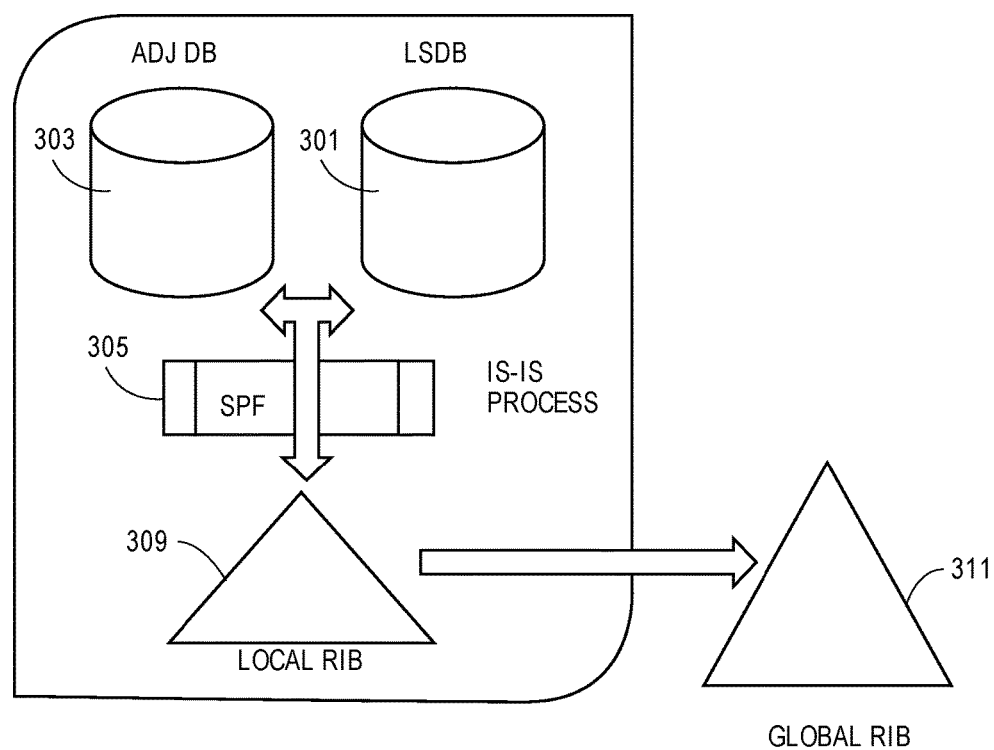
FIG. 3 is a diagram of the components of an IS-IS architecture.

FIG. 3 is a diagram of the basic components of the IS-IS process. The components of the network device that are utilized in the IS-IS process include an adjacency (ADJ) database 303, a link state protocol (LSP) database 301, a shortest path first (SPF) 305 or similar routing process, and a local routing information base (RIB) 309. The adjacency database 303 tracks adjacency information received from neighboring nodes connected through the physical ports and links of the network device. The link state protocol database 301 tracks the topology of the network or autonomous system in which the network device is situated, which is based on exchange of link state packets. A shortest path first 305 or similar route computation algorithm processes the link state protocol database 301 to determine forwarding information that is stored in the local routing information base 309. In some embodiments, the local routing information base is synchronized or downloaded to a global routing information base 311 also referred to as a forwarding information base (FIB) that is shared by all components of the network device such as line cards and similar components or that may be shared with other network devices in the network domain or autonomous system.

After forming adjacencies (ADJ DB) with neighboring nodes and acquiring/synchronizing the LSP database (LSP DB) of the network node, i.e., the source node, will perform an IS-IS decision process. The IS-IS decision process as specified in the IS-IS ISO 10589 Appendix F0.2 specification would result in the local RIB of reachable prefixes of the network with the property of loop free, shortest path to the source node computing. All the paths computed and stored in local RIB will be eventually downloaded to the global RIB, which eventually installs the best routes in the forwarding tables (not shown). As described further herein below the process of determining the topology over which these routes are determined is expanded to incorporate the links of LAGs and their characteristics.

The SPF algorithm used for computing the routes is based on Dijkstra's Algorithm with extensions for computing equal cost paths as specified in the IS-IS ISO 10589 Appendix F0.2 specification. For the primary SPF the source node marked is the root node and shortest path entries to all nodes are computed from the source node. If and when a shortest path entry is identified, all the prefixes of the node would be expanded to have the routes in the local RIB.

The diagram is an illustration to show the storing of the computed prefixes in the local RIB, during the IS-IS decision process, which is important and this is where all the prefixes advertised by the nodes from the above examples are stored.

IS-IS—PCR Operation

Figure 4:
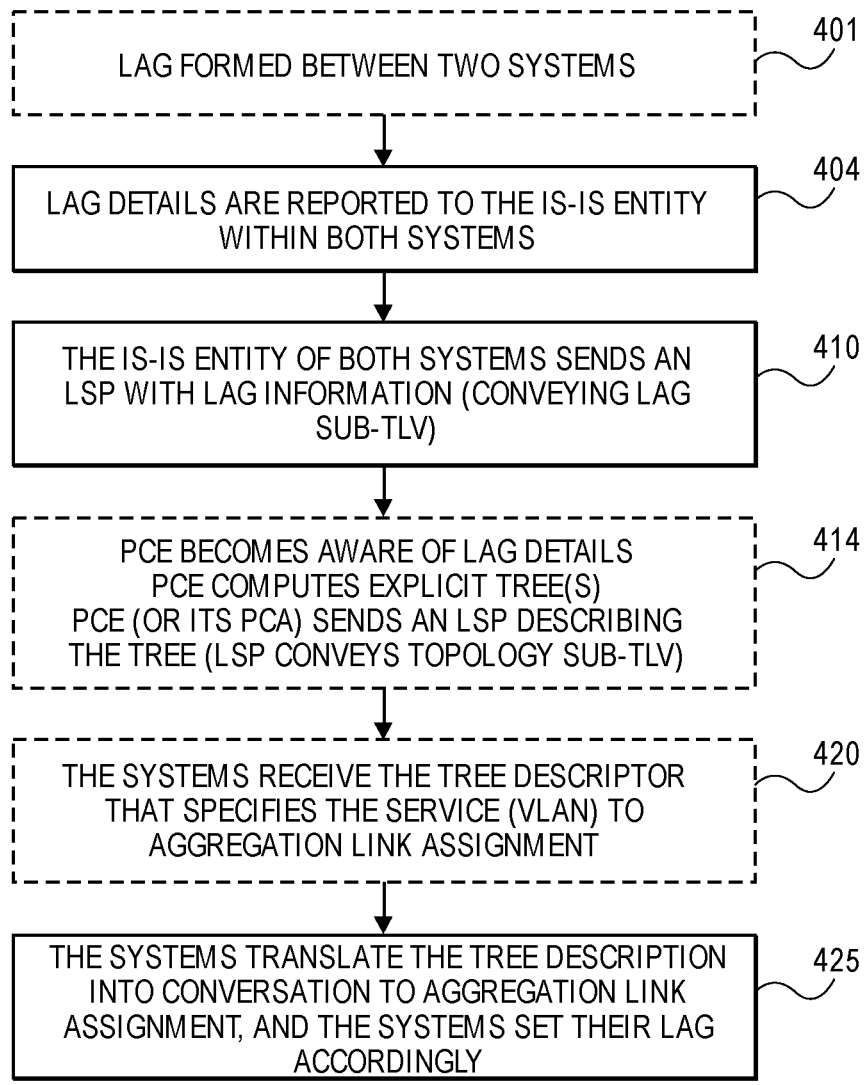
FIG. 4 is a flowchart of one embodiment of a process for IS-IS path control and reservation (PCR).

FIG. 4 is a flowchart of one embodiment of an overall process for enabling the establishment of explicit trees over specific links of a LAG. The process is described with relation to the implementation in combination with an interior gateway protocol (IGP) such as IS-IS, however, one skilled in the art would understand that other IGP (e.g. OSPF) are compatible with the principles, functions and structures described herein. In one embodiment, the process is initiated in response to the formation of a LAG between two systems (e.g., two network devices) or two sets of systems configured as portals (Block 401). The formation of the LAG and its operation can be according to 802.1AX or similar LAG technology. The configuration of the LAG can be reported to the IS-IS entity or module within each of the respective system that form the LAG (Block 404). The reporting of the LAG configuration can encompass any information about the links between the constituent systems of the LAG. The information can include the port information and characteristics of each of the links that form the LAG. Providing this information to the IS-IS module enables the incorporation of the links of the LAG into the overall network topology of the network domain or autonomous system. In one embodiment the Protocol Parser/Multiplex function (see subclause 6.2.7 in IEEE 802.1AX-REV) is used for the reporting of LAG configuration to higher layer entities, e.g. IS-IS.

With the reception of the LAG configuration information, the IS-IS module sends an LSP or similarly reports the LAG configuration information to other network devices in the network domain and to the PCE (Block 410). This information can be conveyed using a specialized sub-TLV such as a LAG sub-TLV or similar mechanism. The LAG sub-TLV can contain any type, amount or organization of information about a LAG configuration using any format consistent with a sub-TLV. The LAG sub-TLV can identify each of the constituent Aggregation Links and any of their characteristics such that they can be included in a topology of the network domain being determined by IS-IS. The preceding steps take place at the individual network devices forming endpoints of a LAG, i.e. Aggregation Systems.

At the PCE upon receipt of the LAG sub-TLV or similar receipt of the characteristics of the LAG and the updating of the link state database maintained by the PCE, the PCE thus becomes aware of the LAG details and computes explicit trees using the updated topology of the network (Block 414). A PCE or the associated PCA then sends an LSP with a tree descriptor in the network domain, e.g. flooding the network domain with the LSP. The explicit trees can be defined in a Topology sub-TLV (as defined in IEEE 802.1 Qca) or similar data structure or sub-TLV that can be incorporated into an LSP or similar message.

Each of the nodes in the network topology receive the LSP including the Topology sub-TLV specifying the explicit trees or similar data structure (Block 420). The LSP specifies the hops of the explicit tree along with a service VID (or similar VID) to aggregation link assignment. All nodes in the domain receive the LSP and each of the nodes that are specified by the explicit tree receive the LSP and translate the tree description in the Topology sub-TLV into conversation to aggregation link assignments and the systems such as network devices configure the LAG to implement these conversation to link assignments (Block 425). The configuration of a LAG conversation sensitive link assignment is described by IEEE 802.1AX and the Topology sub-TLV is described in IEEE 802.1Qca.

Figure 5:
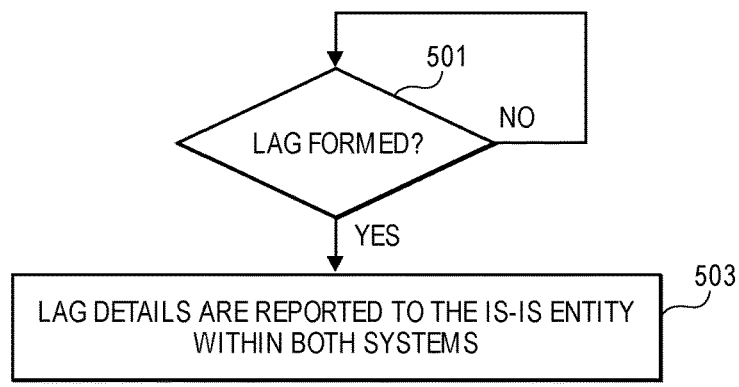
FIG. 5 is a flowchart of one embodiment of a process for generating a LAG report.

FIG. 5 is a diagram of one embodiment of a process for generating a LAG report. In one embodiment, at the time that a LAG is formed, the link aggregation layer (also referred to as or including a LAG module) checks for completion of the configuration of the LAG (Block 501). This check can be made by the link aggregation layer at each of the network devices implementing the LAG or by a similar component of the network device or by a similar controller for the LAG.

Upon detection of the completion of the LAG, a LAG report can be generated including the details of the LAG including the number of aggregated links, a port identifier (PORT ID) for each link in the LAG (the port identifier can serve as a circuit identifier for IS-IS), and similar information (Block 503). The LAG report is provided to an IS-IS entity or module local to the network device or the controller of the network device. The IS-IS module can use this information to update the local link state database as well as to advertise the information via LSPs such that the data ultimately reaches the LSDB of the PCE enabling the PCE to make explicit trees that traverse specified links of the LAG.

Figure 6:
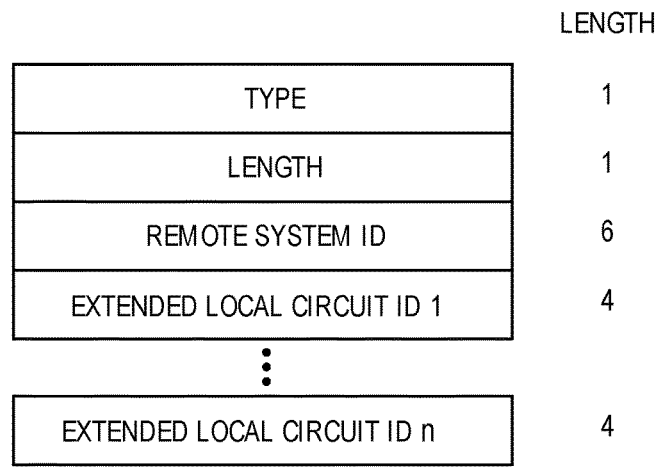
FIG. 6 is a diagram of one embodiment of a LAG descriptor in the form of a LAG sub-TLV.

FIG. 6 is a diagram of one embodiment of a LAG sub-TLV. In one embodiment, the LAG sub-TLV is the data structure that is utilized by the IS-IS module to propagate the link information received via the LAG report across the network domain. There is not a need to exchange hello PDUs as a part of IS-IS between adjacent neighbors in a LAG because link aggregation control protocol (LACP) of the LAG performs this function. The LAG sub-TLV is an added extension to IS-IS and IEEE 802.1Qca. The fields of the LAG sub-TLV include the standard type and length fields, along with a remote system identifier, and a set of extended local circuit identifiers. The remote system identifier is the IS-IS system identifier for the adjacent neighbor forming the LAG with the network device generating the LAG sub-TLV. Each of the extended local circuit identifiers includes a local port identifier for the corresponding link in the LAG.

Figure 7:
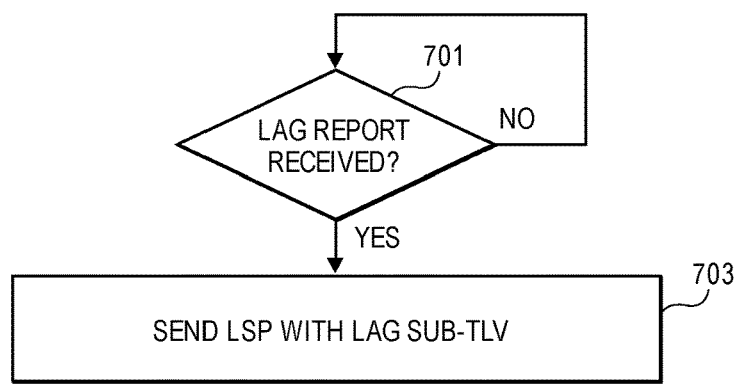
FIG. 7 is a flowchart of one embodiment of a process for generating an LSP including a LAG sub-TLV.

FIG. 7 is a diagram of one embodiment of a process for an IS-IS module in response to a receipt of a LAG report within the same system. The IS-IS module continually checks for the receipt of the LAG report from the aggregation layer (also referred to as or including a LAG module) (Block 701). Upon receipt of the LAG report the IS-IS module generates an LSP to be flooded to the network domain. The LSP includes at least one LAG sub-TLV or similar data structure including the details of the links of the LAG as reported by the LAG report. The LSP reaches the PCE and the LSDB is updated to include the aggregation links. The PCE thus can determine which aggregation link is to be included in an explicit tree and assemble the Topology sub-TLV as specified by IEEE 802.1Qca. The Topology sub-TLV specified by IEEE 802.1Qca D1.0 provides the capability to specify a port (Circuit ID) not only a network node (System ID) that has to be included in an explicit tree. However, IEEE 802.1Qca D1.0 does not support the selection of an aggregation link. As described herein, the parameters of the Topology sub-TLV can be used to specify any of the parallel links of the LAGs as path between two adjacent neighbors in the network domain. The ability to select or specify a particular link of a LAG is supported by use of the extended local circuit identifier of the Hop sub-TLV in a Topology sub-TLV or similar data structure. In one example embodiment, the Extended Local Circuit ID parameter is specified in subclause 45.1.10 in IEEE 802.1Qca D1.0). A VLAN ID parameter has to be also used to determine the conversation to be carried over the given aggregation link(s), which is either the Base VID parameter of the Topology sub-TLV, the VLAN ID and its T/R flags parameter of the Hop sub-TLV or the combination of the two as described herein. The Base VID parameter is specified in subclause 45.1.9 of IEEE 802.1Qca D1.0 while the VLAN and its T/R flags parameter is specified in subclause 45.1.10 in IEEE 802.1Qca D1.0.

When a network device receives an LSP including a Topology sub-TLV a check is made whether a Hop sub-TLV in the received Topology sub-TLV specifies an Extended Local Circuit ID being part of a LAG, then all of the VLANs whose Base VID is conveyed by the Topology sub-TLV have to be carried over the link specified by the Extended Local Circuit ID.

In another embodiment, the topology sub-TLV reception at the network devices initiates a check whether the Topology sub-TLV conveys multiple VLAN IDs. An extended local circuit ID in conjunction with a VID parameter in the Topology sub-TLV can provide the mapping between the VLAN IDs and the client. A single Topology sub-TLV can include as many Hop sub-TLVs as are needed for the same IS-IS network domain or autonomous system and as many mappings to VIDs as are required. All the VIDs listed in one particular Hop sub-TLV are to be carried over the link specified by the extended local circuit ID conveyed by the given Hop sub-TLV.

LAG conversation parameters are then set by the IS-IS module of the network device to implement the forward according to the explicit tree. Thus, in one embodiment, no changes are required to IEEE 802.1AX-REV, but use of the conversation sensitive features provided therein are utilized. In the embodiments disclosed herein, at least one of the new functions introduced is the function that translates the topology sub-TLV to LAG settings, which is performed by the IS-IS module of the network device.

Figure 8:
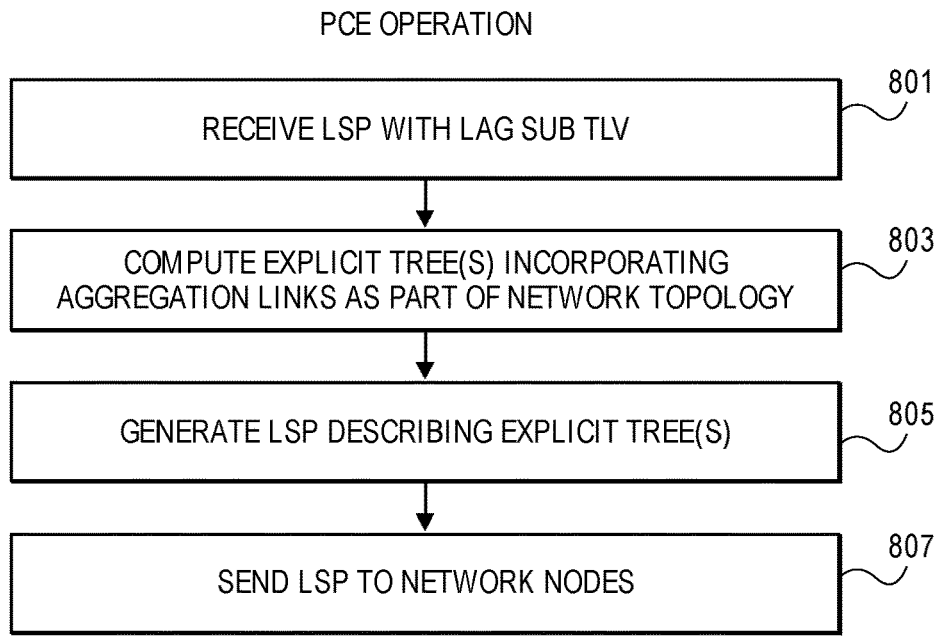
FIG. 8 is a flowchart of one embodiment of a process for the operation of a PCE in computing explicit trees.

FIG. 8 is a flowchart of one embodiment of the process carried out by the PCE upon receipt of the LSP including a LAG sub-TLV. The PCE receives all the LSP that are flooded into the network domain. The LSP are utilized to update the LSDB maintained by the PCE. When a change to the topology of the network is detected the explicit trees calculated in accordance with IEEE 802.1Qca may be updated by the PCE including in instances where the LSP provides new information about the links of LAGs in the network domain. In one embodiment, the aggregation link information is received when an LSP with a LAG sub-TLV is received at the PCE (Block 801).

In response to updating the LSDB and determining that a change in known network topology has occurred, the PCE computes (or recomputes) the explicit trees using the updated network topology incorporating the aggregation links (Block 803). The computation of the explicit trees can be carried out using an explicit tree computation algorithm, for example those specified by IEEE 802.1Qca. After the computation is complete, then the PCE generates an LSP to advertise the explicit trees. The LSP can include a Topology sub-TLV to describe the explicit trees and to provide associated VIDs and similar information (Block 805). The Topology sub-TLV can specify aggregation links to be included in the explicit tree as described by this application. The PCE can then forward the LSP into the network domain to flood the network domain and cause the nodes in the explicit tree to set up the proper forwarding to implement the explicit trees (Block 807).

Figure 9:
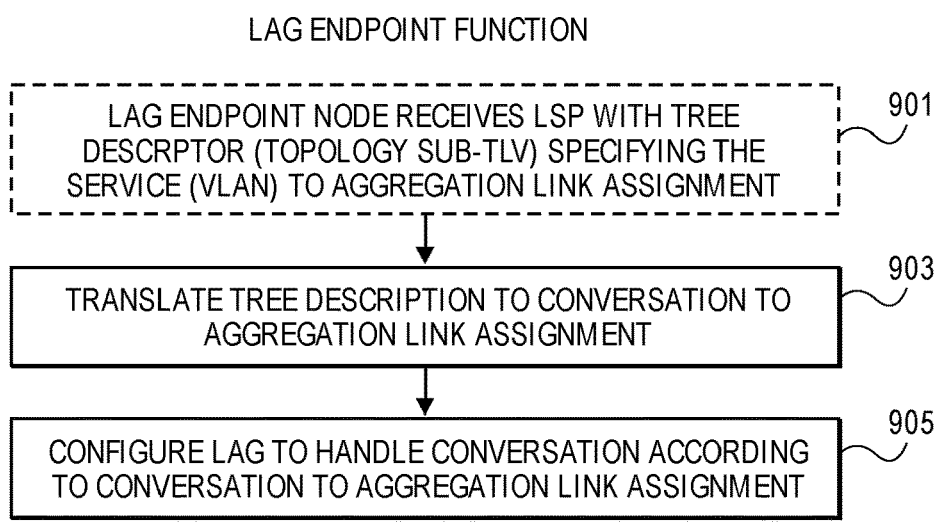
FIG. 9 is a flowchart of one embodiment of a process for the operation of a LAG endpoint to configure forwarding using links of the LAG to implement an explicit tree.

FIG. 9 is a flowchart of one embodiment of a process carried out by the node serving as a LAG endpoint in a network domain, i.e. an Aggregation System. The nodes that form endpoints of LAGs have advertised the details of the LAGs they have formed with each of their adjacent neighbors including information identifying each of the links of the LAGs. These nodes will then receive LSPs advertising explicit trees that traverse the node and specify links of the LAGs to be traversed as a next hop, where these LSPs originate from the PCE or its PCA. Thus, the process begins upon receipt of such an LSP by the node serving as a LAG endpoint where the LSP specifies the outbound link or port for traffic forwarding to be associated with a particular service or similar VID (Block 901). The IS-IS module of the receiving node then translates the tree description of the LSP, which in some embodiments is in the form of a Topology sub-TLV into a conversation to aggregation link assignment (Block 903). This information is then provided to the aggregation layer such that the LAG can be configured to handle the conversation according to the conversation to link assignment determined by the IS-IS module (Block 905).

Figure 10:
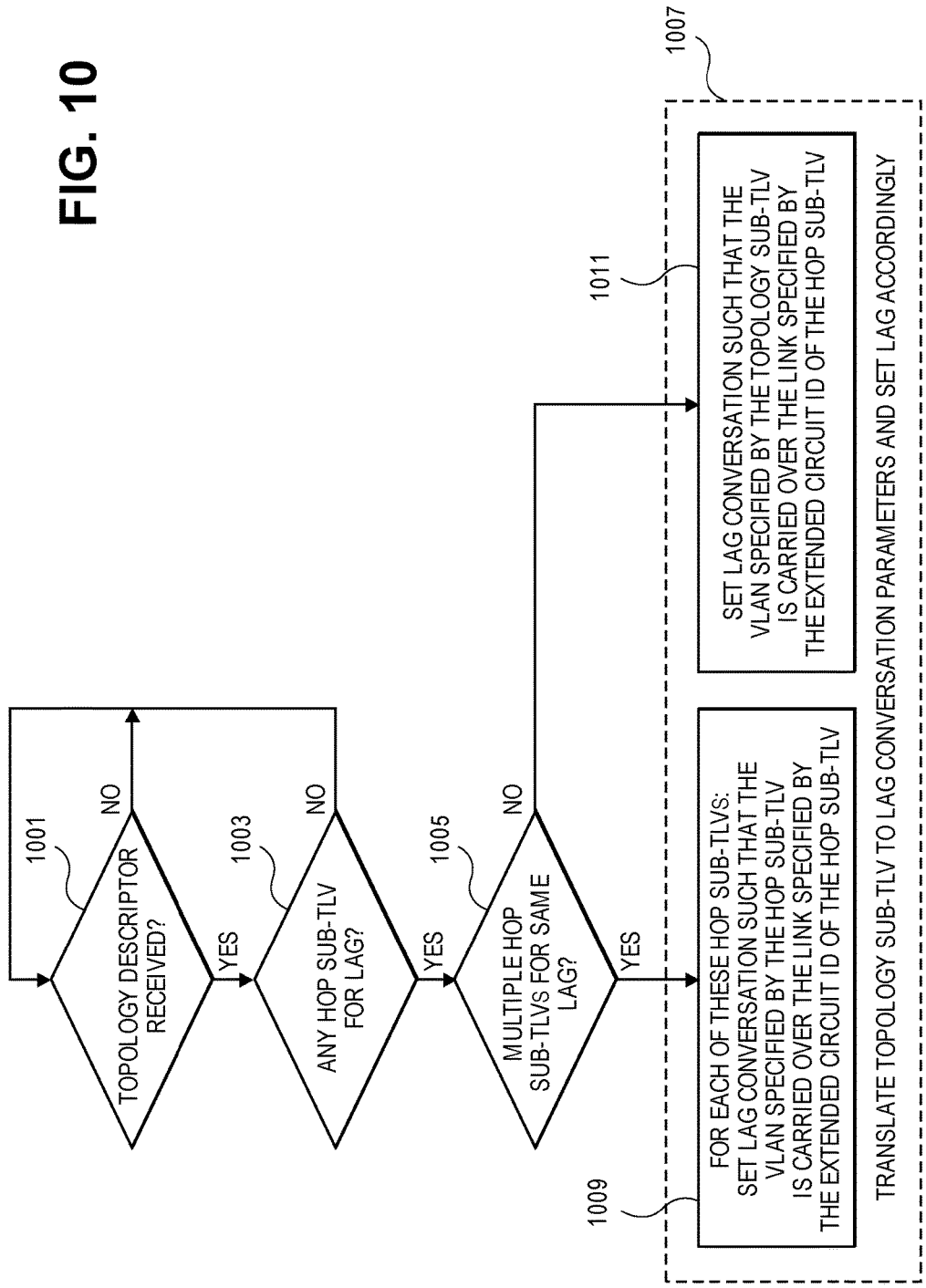
FIG. 10 is a flowchart of one embodiment of a process for converting a Topology sub-TLV into a conversation to aggregation link mapping.

FIG. 10 is a flowchart of one embodiment of a process for handling received LSPs including Topology sub-TLVs. This example embodiment provides additional detail on one process for handling the received LSPs. In particular this embodiment provides a method capable of handling alternate methods of specifying links across a LAG where multiple links may be identified in a single LSP or only a single link is specified. The LSPs are checked to determine whether they include a Topology descriptor such as the Topology sub-TLV or similar descriptor (Block 1001). If not then there is no need for additional specialized processing related to handling explicit paths and the processing of the LSP is handled in a conventional manner, while this process awaits the next LSP. A check is then made if a LSP with a Topology sub-TLV is received whether it specifies any Hop sub-TLVs (Block 1003). If no Hop sub-TLVs are specified in the Topology sub-TLV then this process awaits the next LSP to be received with a Topology sub-TLV (Block 1001).

If a Hop sub-TLV is received, then the process checks whether there are additional Hop sub-TLVs for the same LAG that are present in the Topology sub-TLV of the received LSP (Block 1005). In either case the process then continues to perform the translation of the Topology sub-TLV to a set of LAG conversation parameters and associating them with links of a LAG (Block 1007). In one embodiment, a configuration table that maps conversation IDs to Link Numbers is created as part of the translation of the Topology sub-TLV to LAG configuration parameters. If only one Hop sub-TLV is found per LAG then the process sets the LAG conversation such that the VLAN specified by the Topology sub-TLV is carried over the link specified by the extended circuit identifier of the Hop sub-TLV (Block 1011). However, if multiple Hop sub-TLVs are related to the same LAG or aggregation link, then the process sets a LAG conversation for each Hop sub-TLV such that the VLAN specified by the Hop sub-TLV (rather than the Topology sub-TLV) is associated with the link specified by the extended circuit identifier of the Hop sub-TLV (Block 1009).

Example embodiments of processes for sharing the LAG information with IS-IS and enabling the computation of explicit trees identifying specific links of LAGs in a network domain have been provided. These embodiments provide a mechanism for the inter-working of IEEE 802.1AX LAG management with IEEE 802.1Qca. However, those skilled in the art would understand that other embodiments or combinations of processes are possible consistent with the principles and structures described herein.

Figure 11A:
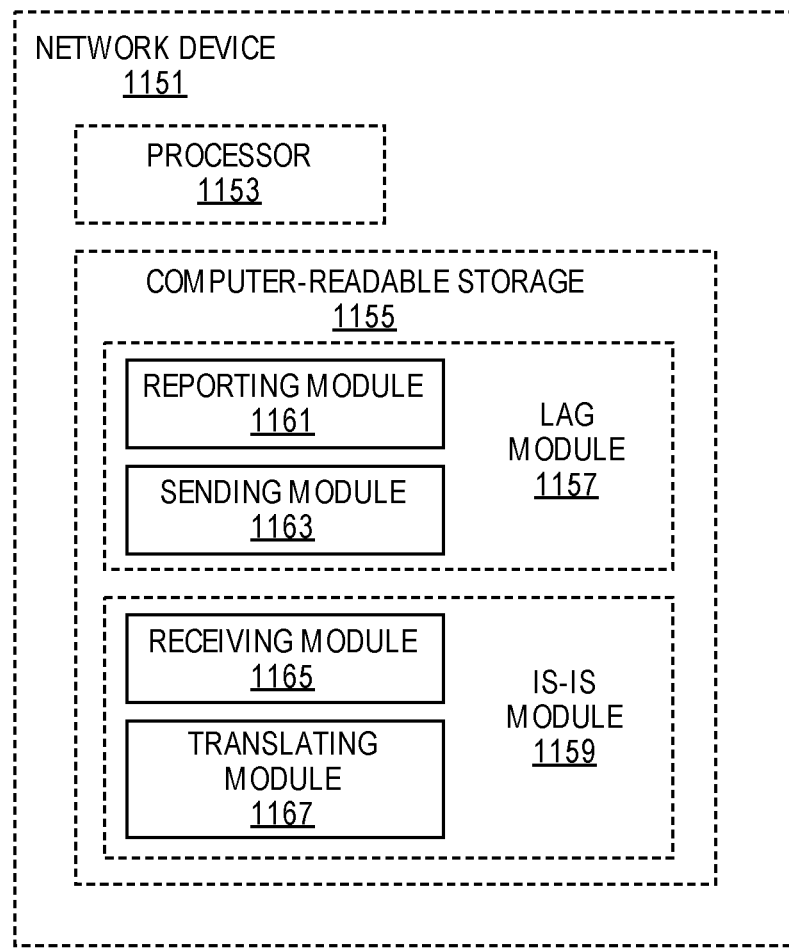
FIG. 11A is a diagram of one embodiment of a network device implementing functions of the LAG module and IS-IS module.

FIG. 11A is a diagram of one embodiment of a network device implementing the functions of the LAG module and the IS-IS module. FIG. 11A represents one example embodiment, whereas other embodiments are discussed herein below including those described in regard to FIGS. 11B-13. In this embodiment, a network device 1151 enables the provisioning of explicit trees in a network by reporting link aggregation group LAG configuration information to the path computation element PCE. A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

The network device 1151 includes at least a processor 1153 and a computer-readable storage device 1155. The network device 1151 can include any number of other components including I/O devices, interconnects, security processors and similar components, but for sake of clarity these other components have been omitted. The network device is configured to implement a LAG module 1157 and an intermediate system intermediate system (IS-IS) module 1159, which may include an IS-IS path control and reservation module (ISIS-PCR) or similar components. The LAG module 1157 and IS-IS module 1159 can be discrete hardware components such as application specific integrated circuits, software or similar components. The software modules can be stored in the computer-readable storage device 1155 and discrete hardware implementations can be implemented independent of the computer-readable storage device 1155. In further embodiments, the LAG module 1157 and IS-IS module 1159 can be implemented across multiple devices in a distributed implementation. Further, examples are described herein below.

In one embodiment, a reporting module 1161 is configured to report LAG configuration to the IS-IS module 1159 within the network device 1151. The reporting module 1161 can be a component of the LAG module 1157 or can be a separate module. A sending module 1163 is configured to send a link state PDU (LSP) with the LAG configuration in a LAG sub TLV. The sending module 1163 can be a component of the LAG module 1157 or can be a separate module. The reporting module 1161 and sending module 1163 can be implemented in a single network device 1151 or distributed over multiple network devices 1151 such as in virtualized environments.

In one embodiment, a receiving module 1165 is configured to receive an explicit tree that specifies at least one assignment of a virtual local area network (VLAN) identifier (VID) to an aggregation link of the LAG. The receiving module 1165 can be a component of the IS-IS module 1159 or a separate component of the network device 1151. A translating module 1167 can be configured to translate the explicit tree into a LAG configuration. The translating module 1167 can be a part of or the IS-IS module 1159 or a separate component of the network device 1151. In one embodiment, the LAG configuration specifies a conversation to aggregation link assignment, where the conversation is associated with the explicit tree and VID.

In further embodiments, the process and implementing network device can be implemented without ISIS-PCR, a PCE and similar implementation specific structures. These structures are provided by way of example and not limitations. In some embodiments, the process is implemented by a network device to enable provisioning of explicit trees in a network by reporting LAG configuration information by IS-IS to all other IS-IS entities in the network domain, which may include a PCE if present in the network domain. The network device may implement a LAG module and IS-IS module, these modules may then in turn include any combination of the reporting module, sending module, receiving module, translating module, ISIS-PCR module and similar components. The LAG module can be configured to report LAG configuration to the IS-IS module. The IS-IS module can then send a LSP with the LAG configuration in a LAG sub TLV and subsequently receive an explicit tree that specifies at least one virtual local area network VID to aggregation link of the LAG assignment. The IS-IS module can translate the explicit tree into a LAG configuration, the LAG configuration specifying a conversation to aggregation link assignment.

Figure 11B:
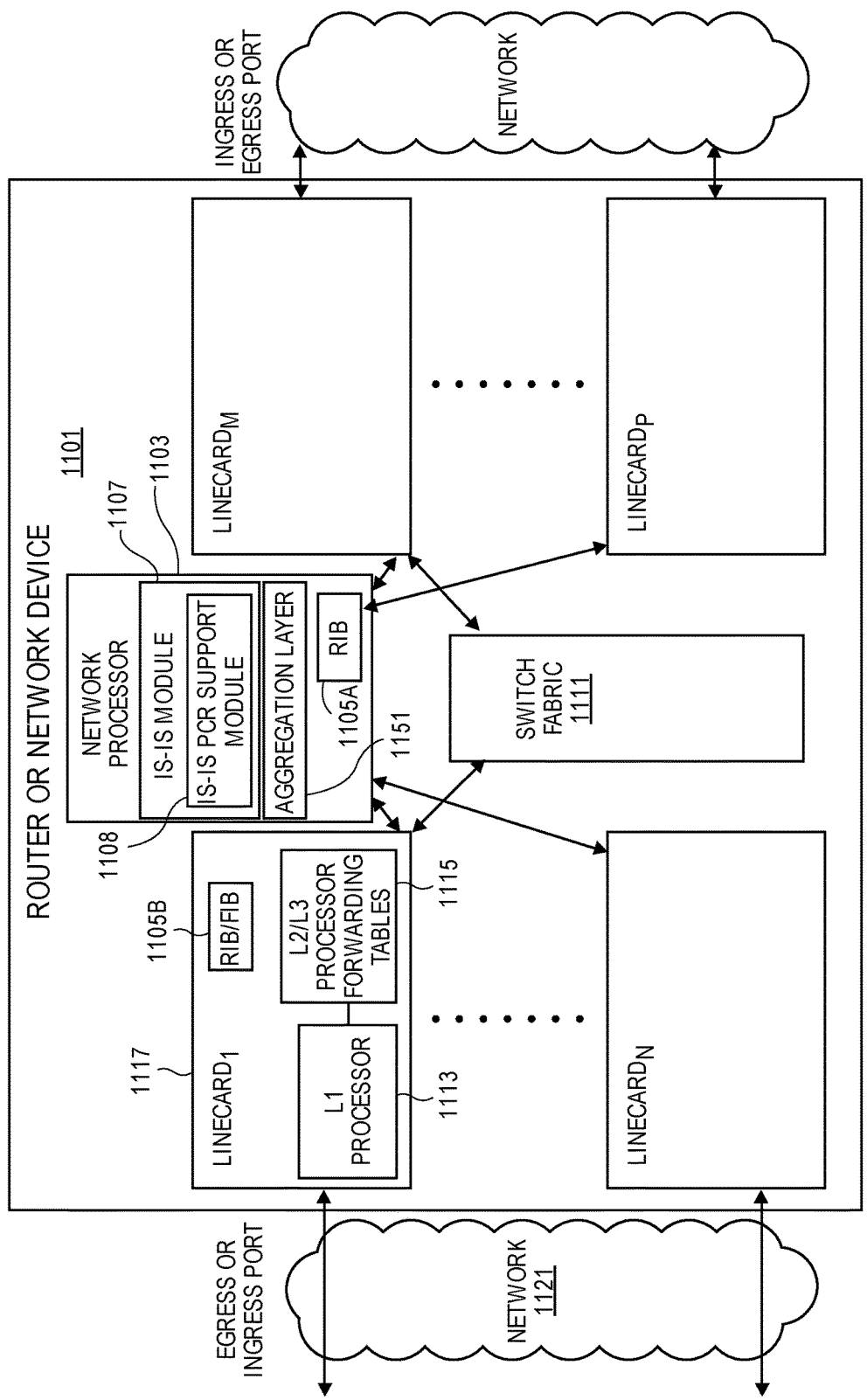
FIG. 11B is a diagram of one embodiment of a network device implementing the IS-IS PCR functions.

FIG. 11B is a diagram of one embodiment of a network device implementing the IS-IS-PCR establishment process for LAGs in a network domain.

In one embodiment, the process is implemented by a router 1101 or network device or similar computing device. The router 1101 can have any structure that enables it to receive data traffic and forward it toward its destination. The router 1101 can include a network processor 1103 or set of network processors that execute the functions of the router 1101. A 'set,' as used herein, is any positive whole number of items including one item. The router 1101 or network element can execute IS-IS PCR and aggregation layer process functionality via a network processor 1103 or other components of the router 1101. The network processor 1103 can implement the IS-IS PCR and aggregation layer functions stored as an IS-IS module 1107 and the IS-IS PCR support module 1108, which includes the explicit path (EP) computation using conversation sensitive aggregation links described herein above. The network processor can also service the aggregation layer 1151 (also referred to herein as or including a LAG module) and routing information base 1105A.

The IS-IS and aggregation layer process functions can be implemented as modules in any combination of software, including firmware, and hardware within the router. The functions of the IS-IS and aggregation layer process that are executed and implemented by the router 1101 include those described further herein above including the explicit path computation using aggregation links.

In one embodiment, the router 1101 can include a set of line cards 1117 that process and forward the incoming data traffic toward the respective destination nodes by identifying the destination and forwarding the data traffic to the appropriate line card 1117 having an egress port that leads to or toward the destination via a next hop. These line cards 1117 can also implement the forwarding information base 1105B, or a relevant subset thereof. The line cards 1117 can also implement or facilitate the IS-IS and aggregation layer process functions described herein above. For example, the line cards 1117 can implement LAG report and LAG configuration functions and similar functions. The line cards 1117 are in communication with one another via a switch fabric 1111 and communicate with other nodes over attached networks 1121 using Ethernet, fiber optic or similar communication links and media.

The operations of the flow diagrams have been described with reference to the exemplary embodiment of the block diagrams. However, it should be understood that the operations of the flowcharts can be performed by embodiments of the invention other than those discussed, and the embodiments discussed with reference to block diagrams can perform operations different than those discussed with reference to the flowcharts. While the flowcharts show a particular order of operations performed by certain embodiments, it should be understood that such order is exemplary (e.g., alternative embodiments may perform the operations in a different order, combine certain operations, overlap certain operations, etc.).

As described herein, operations performed by the router may refer to specific configurations of hardware such as application specific integrated circuits (ASICs) configured to perform certain operations or having a predetermined functionality, or software instructions stored in memory embodied in a non-transitory computer readable storage medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. One or more parts of an embodiment of the invention may be implemented using different combinations of software, firmware, and/or hardware.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

FIG. 12A illustrates connectivity between network devices (NDs) within an exemplary network, as well as three exemplary implementations of the NDs, according to some embodiments of the invention. FIG. 12A shows NDs 1200A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 1200A, E, and F illustrates that these NDs act as ingress and egress points for the network (and thus, these NDs are sometimes referred to as edge NDs; while the other NDs may be called core NDs).

Two of the exemplary ND implementations in FIG. 12A are: 1) a special-purpose network device 1202 that uses custom application-specific integrated-circuits (ASICs) and a proprietary operating system (OS); and 2) a general purpose network device 1204 that uses common off-the-shelf (COTS) processors and a standard OS.

The special-purpose network device 1202 includes networking hardware 1210 comprising compute resource(s) 1212 (which typically include a set of one or more processors), forwarding resource(s) 1214 (which typically include one or more ASICs and/or network processors), and physical network interfaces (NIs) 1216 (sometimes called physical ports), as well as non-transitory machine readable storage media 1218 having stored therein networking software 1220. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 1200A-H. During operation, the networking software 1220 may be executed by the networking hardware 1210 to instantiate a set of one or more networking software instance(s) 1222. Each of the networking software instance(s) 1222, and that part of the networking hardware 1210 that executes that network software instance (be it hardware dedicated to that networking software instance and/or time slices of hardware temporally shared by that networking software instance with others of the networking software instance(s) 1222), form a separate virtual network element 1230A-R. Each of the virtual network element(s) (VNEs) 1230A-R includes a control communication and configuration module 1232A-R (sometimes referred to as a local control module or control communication module) and forwarding table(s) 1234A-R, such that a given virtual network element (e.g., 1230A) includes the control communication and configuration module (e.g., 1232A), a set of one or more forwarding table(s) (e.g., 1234A), and that portion of the networking hardware 1210 that executes the virtual network element (e.g., 1230A). In some embodiments, the control communication and configuration module 1232A encompasses an aggregation layer 1291A (also referred to as or including a LAG module) that manages the configuration of a set of aggregated links between the network device and an adjacent network device. An IS-IS module 1233A can similarly manage network discovery and routing table management responsibilities and an IS-IS PCR module 1235A can facilitate the interaction with the aggregation layer 1291A such that explicit trees that specify particular links of a LAG can be utilized.

The special-purpose network device 1202 is often physically and/or logically considered to include: 1) a ND control plane 1224 (sometimes referred to as a control plane) comprising the compute resource(s) 1212 that execute the control communication and configuration module(s) 1232A-R; and 2) a ND forwarding plane 1226 (sometimes referred to as a forwarding plane, a data plane, or a media plane) comprising the forwarding resource(s) 1214 that utilize the forwarding table(s) 1234A-R and the physical NIs 1216. By way of example, where the ND is a router (or is implementing routing functionality), the ND control plane 1224 (the compute resource(s) 1212 executing the control communication and configuration module(s) 1232A-R) is typically responsible for participating in controlling how data (e.g., packets) is to be routed (e.g., the next hop for the data and the outgoing physical NI for that data) and storing that routing information in the forwarding table(s) 1234A-R, and the ND forwarding plane 1226 is responsible for receiving that data on the physical NIs 1216 and forwarding that data out the appropriate ones of the physical NIs 1216 based on the forwarding table(s) 1234A-R.

FIG. 12B illustrates an exemplary way to implement the special-purpose network device 1202 according to some embodiments of the invention. FIG. 12B shows a special-purpose network device including cards 1238 (typically hot pluggable). While in some embodiments the cards 1238 are of two types (one or more that operate as the ND forwarding plane 1226 (sometimes called line cards), and one or more that operate to implement the ND control plane 1224 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 1236 (e.g., a first full mesh coupling the line cards and a second full mesh coupling all of the cards).

Returning to FIG. 12A, the general purpose network device 1204 includes hardware 1240 comprising a set of one or more processor(s) 1242 (which are often COTS processors) and network interface controller(s) 1244 (NICs; also known as network interface cards) (which include physical NIs 1246), as well as non-transitory machine readable storage media 1248 having stored therein software 1250. During operation, the processor(s) 1242 execute the software 1250 to instantiate a hypervisor 1254 (sometimes referred to as a virtual machine monitor (VMM)) and one or more virtual machines 1262A-R that are run by the hypervisor 1254, which are collectively referred to as software instance(s) 1252. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 1262A-R, and that part of the hardware 1240 that executes that virtual machine (be it hardware dedicated to that virtual machine and/or time slices of hardware temporally shared by that virtual machine with others of the virtual machine(s) 1262A-R), forms a separate virtual network element(s) 1260A-R. In some embodiments, the virtual machine module 1262A encompasses an aggregation layer 1293A that manages the configuration of a set of aggregated links between the network device and an adjacent network device. An IS-IS module 1263A can similarly manage network discovery and routing table management responsibilities and an IS-IS PCR module 1265A can facilitate the interaction with the aggregation layer 1293A such that explicit trees that specify particular links of a LAG can be utilized.

The virtual network element(s) 1260A-R perform similar functionality to the virtual network element(s) 1230A-R. For instance, the hypervisor 1254 may present a virtual operating platform that appears like networking hardware 1210 to virtual machine 1262A, and the virtual machine 1262A may be used to implement functionality similar to the control communication and configuration module(s) 1232A and forwarding table(s) 1234A (this virtualization of the hardware 1240 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the virtual machine(s) 1262A-R differently. For example, while embodiments of the invention are illustrated with each virtual machine 1262A-R corresponding to one VNE 1260A-R, alternative embodiments may implement this correspondence at a finer level granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 1254 includes a virtual switch that provides similar forwarding services as a physical Ethernet switch. Specifically, this virtual switch forwards traffic between virtual machines and the NIC(s) 1244, as well as optionally between the virtual machines 1262A-R; in addition, this virtual switch may enforce network isolation between the VNEs 1260A-R that by policy are not permitted to communicate with each other (e.g., by honoring virtual local area networks (VLANs)).

The third exemplary ND implementation in FIG. 12A is a hybrid network device 1206, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 1202) could provide for para-virtualization to the networking hardware present in the hybrid network device 1206.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 1230A-R, VNEs 1260A-R, and those in the hybrid network device 1206) receives data on the physical NIs (e.g., 1216, 1246) and forwards that data out the appropriate ones of the physical NIs (e.g., 1216, 1246). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

Figure 12C:
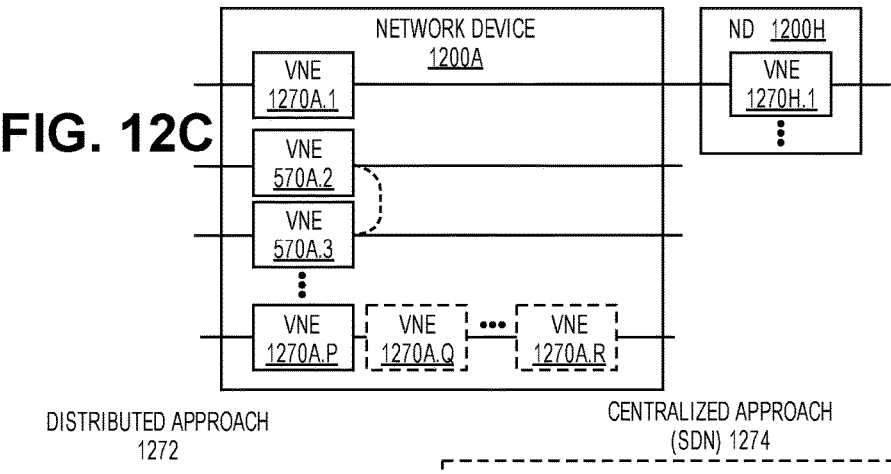
FIG. 12C illustrates various exemplary ways in which virtual network elements (VNEs) may be coupled according to some embodiments of the invention.

FIG. 12C illustrates various exemplary ways in which VNEs may be coupled according to some embodiments of the invention. FIG. 12C shows VNEs 1270A.1-1270A.P (and optionally VNEs 1270A.Q-1270A.R) implemented in ND 1200A and VNE 1270H.1 in ND 1200H. In FIG. 12C, VNEs 1270A.1-P are separate from each other in the sense that they can receive packets from outside ND 1200A and forward packets outside of ND 1200A; VNE 1270A.1 is coupled with VNE 1270H.1, and thus they communicate packets between their respective NDs; VNE 1270A.2-1270A.3 may optionally forward packets between themselves without forwarding them outside of the ND 1200A; and VNE 1270A.P may optionally be the first in a chain of VNEs that includes VNE 1270A.Q followed by VNE 1270A.R (this is sometimes referred to as dynamic service chaining, where each of the VNEs in the series of VNEs provides a different service—e.g., one or more layer 4-7 network services). While FIG. 12C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 12A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 12A may also host one or more such servers (e.g., in the case of the general purpose network device 1204, one or more of the virtual machines 1262A-R may operate as servers; the same would be true for the hybrid network device 1206; in the case of the special-purpose network device 1202, one or more such servers could also be run on a hypervisor executed by the compute resource(s) 1212); in which case the servers are said to be co-located with the VNEs of that ND.

A virtual network is a logical abstraction of a physical network (such as that in FIG. 12A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 12D:
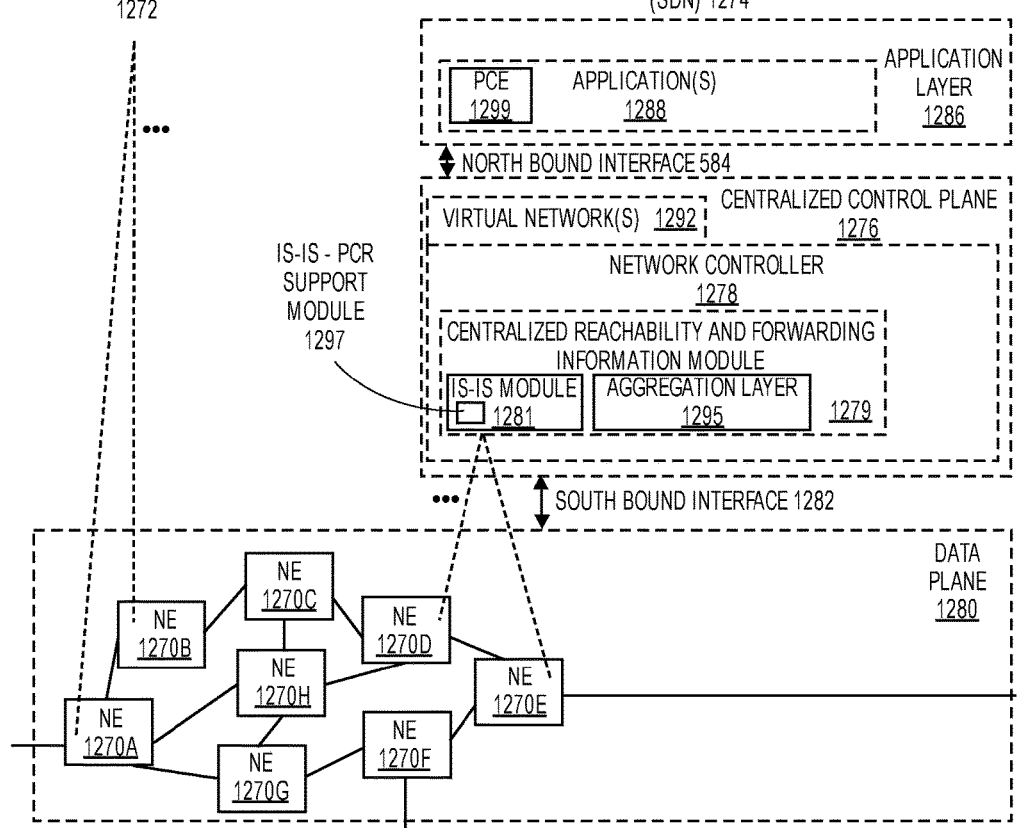
FIG. 12D illustrates a network with a single network element (NE) on each of the NDs of FIG. 12A, and within this straight forward approach contrasts a traditional distributed approach (commonly used by traditional routers) with a centralized approach for maintaining reachability and forwarding information (also called network control), according to some embodiments of the invention.

FIG. 12D illustrates a network with a single network element on each of the NDs of FIG. 12A, and within this straight forward approach contrasts a traditional distributed approach (commonly used by traditional routers) with a centralized approach for maintaining reachability and forwarding information (also called network control), according to some embodiments of the invention. Specifically, FIG. 12D illustrates network elements (NEs) 1270A-H with the same connectivity as the NDs 1200A-H of FIG. 12A.

FIG. 12D illustrates that the distributed approach 1272 distributes responsibility for generating the reachability and forwarding information across the NEs 1270A-H; in other words, the process of neighbor discovery and topology discovery is distributed.

For example, where the special-purpose network device 1202 is used, the control communication and configuration module(s) 1232A-R of the ND control plane 1224 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 1270A-H (e.g., the compute resource(s) 1212 executing the control communication and configuration module(s) 1232A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 1224. The ND control plane 1224 programs the ND forwarding plane 1226 with information (e.g., adjacency and route information) based on the routing structure(s). For example, the ND control plane 1224 programs the adjacency and route information into one or more forwarding table(s) 1234A-R (e.g., Forwarding Information Base (FIB), Label Forwarding Information Base (LFIB), and one or more adjacency structures) on the ND forwarding plane 1226. For layer 2 forwarding, the ND can store one or more bridging tables that are used to forward data based on the layer 2 information in that data. While the above example uses the special-purpose network device 1202, the same distributed approach 1272 can be implemented on the general purpose network device 1204 and the hybrid network device 1206.

FIG. 12D illustrates that a centralized approach 1274 (also known as software defined networking (SDN)) that decouples the system that makes decisions about where traffic is sent from the underlying systems that forwards traffic to the selected destination. The illustrated centralized approach 1274 has the responsibility for the generation of reachability and forwarding information in a centralized control plane 1276 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 1276 has a south bound interface 1282 with a data plane 1280 (sometime referred to the infrastructure layer, network forwarding plane, or forwarding plane (which should not be confused with a ND forwarding plane)) that includes the NEs 1270A-H (sometimes referred to as switches, forwarding elements, data plane elements, or nodes). The centralized control plane 1276 includes a network controller 1278, which includes a centralized reachability and forwarding information module 1279 that determines the reachability within the network and distributes the forwarding information to the NEs 1270A-H of the data plane 1280 over the south bound interface 1282 (which may use the OpenFlow protocol). Thus, the network intelligence is centralized in the centralized control plane 1276 executing on electronic devices that are typically separate from the NDs.

For example, where the special-purpose network device 1202 is used in the data plane 1280, each of the control communication and configuration module(s) 1232A-R of the ND control plane 1224 typically include a control agent that provides the VNE side of the south bound interface 1282. In this case, the ND control plane 1224 (the compute resource(s) 1212 executing the control communication and configuration module(s) 1232A-R) performs its responsibility for participating in controlling how data (e.g., packets) is to be routed (e.g., the next hop for the data and the outgoing physical NI for that data) through the control agent communicating with the centralized control plane 1276 to receive the forwarding information (and in some cases, the reachability information) from the centralized reachability and forwarding information module 1279 (it should be understood that in some embodiments of the invention, the control communication and configuration module(s) 1232A-R, in addition to communicating with the centralized control plane 1276, may also play some role in determining reachability and/or calculating forwarding information—albeit less so than in the case of a distributed approach; such embodiments are generally considered to fall under the centralized approach 1274, but may also be considered a hybrid approach). In some embodiments, the centralized reachability and forwarding module 1279 encompasses an aggregation layer 1295 that manages the configuration of a set of aggregated links between the network device and an adjacent network device. An IS-IS module 1281 can similarly manage network discovery and routing table management responsibilities and an IS-IS PCR module 1297A can facilitate the interaction with the aggregation layer 1295 such that explicit trees that specify particular links of a LAG can be utilized.

While the above example uses the special-purpose network device 1202, the same centralized approach 1274 can be implemented with the general purpose network device 1204 (e.g., each of the VNE 1260A-R performs its responsibility for controlling how data (e.g., packets) is to be routed (e.g., the next hop for the data and the outgoing physical NI for that data) by communicating with the centralized control plane 1276 to receive the forwarding information (and in some cases, the reachability information) from the centralized reachability and forwarding information module 1279; it should be understood that in some embodiments of the invention, the VNEs 1260A-R, in addition to communicating with the centralized control plane 1276, may also play some role in determining reachability and/or calculating forwarding information—albeit less so than in the case of a distributed approach) and the hybrid network device 1206. In fact, the use of SDN techniques can enhance the NFV techniques typically used in the general purpose network device 1204 or hybrid network device 1206 implementations as NFV is able to support SDN by providing an infrastructure upon which the SDN software can be run, and NFV and SDN both aim to make use of commodity server hardware and physical switches.

FIG. 12D also shows that the centralized control plane 1276 has a north bound interface 1284 to an application layer 1286, in which resides application(s) 1288. The centralized control plane 1276 has the ability to form virtual networks 1292 (sometimes referred to as a logical forwarding plane, network services, or overlay networks (with the NEs 1270A-H of the data plane 1280 being the underlay network)) for the application(s) 1288. Thus, the centralized control plane 1276 maintains a global view of all NDs and configured NEs/VNEs, and it maps the virtual networks to the underlying NDs efficiently (including maintaining these mappings as the physical network changes either through hardware (ND, link, or ND component) failure, addition, or removal). In some embodiments, the PCE 1299 as described herein above and/or an associated PCA (not shown) can be implemented at the application layer 1286.

While FIG. 12D shows the distributed approach 1272 separate from the centralized approach 1274, the effort of network control may be distributed differently or the two combined in certain embodiments of the invention. For example: 1) embodiments may generally use the centralized approach (SDN) 1274, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 1274, but may also be considered a hybrid approach.

While FIG. 12D illustrates the simple case where each of the NDs 1200A-H implements a single NE 1270A-H, it should be understood that the network control approaches described with reference to FIG. 12D also work for networks where one or more of the NDs 1200A-H implement multiple VNEs (e.g., VNEs 1230A-R, VNEs 1260A-R, those in the hybrid network device 1206). Alternatively or in addition, the network controller 1278 may also emulate the implementation of multiple VNEs in a single ND. Specifically, instead of (or in addition to) implementing multiple VNEs in a single ND, the network controller 1278 may present the implementation of a VNE/NE in a single ND as multiple VNEs in the virtual networks 1292 (all in the same one of the virtual network(s) 1292, each in different ones of the virtual network(s) 1292, or some combination). For example, the network controller 1278 may cause an ND to implement a single VNE (a NE) in the underlay network, and then logically divide up the resources of that NE within the centralized control plane 1276 to present different VNEs in the virtual network(s) 1292 (where these different VNEs in the overlay networks are sharing the resources of the single VNE/NE implementation on the ND in the underlay network).

Figures 12E, 12F:
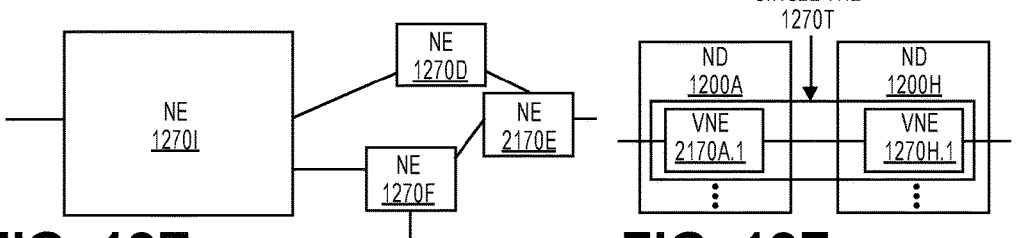
FIG. 12E illustrates the simple case of where each of the NDs 1200A-H implements a single NE 1270A-H (see FIG. 12D), but the centralized control plane 1276 has abstracted multiple of the NEs in different NDs (the NEs 1270A-C and G-H) into (to represent) a single NE 1270I in one of the virtual network(s) 1292 of FIG. 12D, according to some embodiments of the invention.
FIG. 12F illustrates a case where multiple VNEs (VNE 1270A.1 and VNE 1270H.1) are implemented on different NDs (ND 1200A and ND 1200H) and are coupled to each other, and where the centralized control plane 1276 has abstracted these multiple VNEs such that they appear as a single VNE 1270T within one of the virtual networks 1292 of FIG. 12D, according to some embodiments of the invention.

On the other hand, FIGS. 12E and 12F respectively illustrate exemplary abstractions of NEs and VNEs that the network controller 1278 may present as part of different ones of the virtual networks 1292. FIG. 12E illustrates the simple case of where each of the NDs 1200A-H implements a single NE 1270A-H (see FIG. 12D), but the centralized control plane 1276 has abstracted multiple of the NEs in different NDs (the NEs 1270A-C and G-H) into (to represent) a single NE 1270I in one of the virtual network(s) 1292 of FIG. 12D, according to some embodiments of the invention. FIG. 12E shows that in this virtual network, the NE 1270I is coupled to NE 1270D and 1270F, which are both still coupled to NE 1270E.

FIG. 12F illustrates a case where multiple VNEs (VNE 1270A.1 and VNE 1270H.1) are implemented on different NDs (ND 1200A and ND 1200H) and are coupled to each other, and where the centralized control plane 1276 has abstracted these multiple VNEs such that they appear as a single VNE 1270T within one of the virtual networks 1292 of FIG. 12D, according to some embodiments of the invention. Thus, the abstraction of a NE or VNE can span multiple NDs.

While some embodiments of the invention implement the centralized control plane 1276 as a single entity (e.g., a single instance of software running on a single electronic device), alternative embodiments may spread the functionality across multiple entities for redundancy and/or scalability purposes (e.g., multiple instances of software running on different electronic devices).

Figure 13:
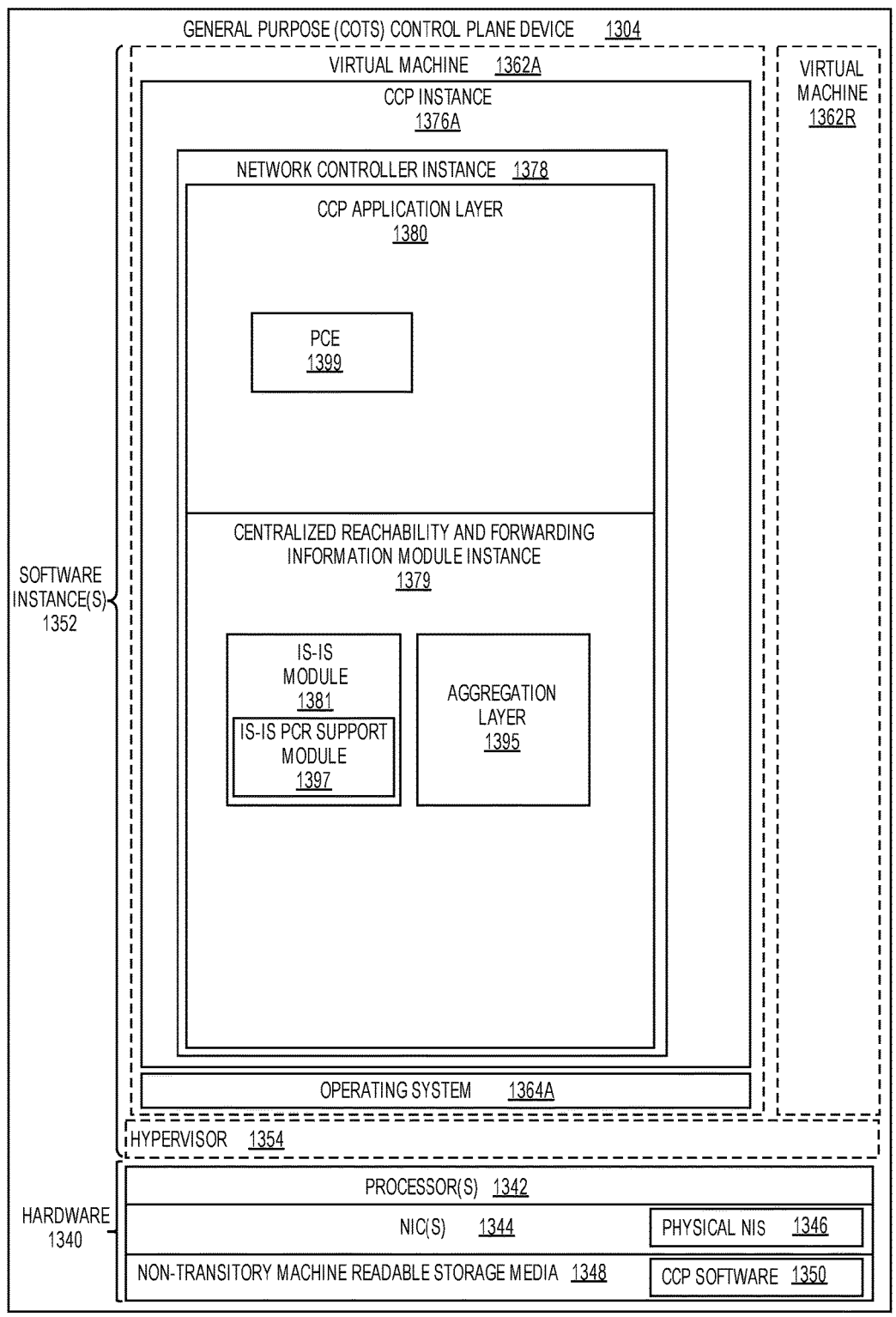
FIG. 13 illustrates a general purpose control plane device 1304 including hardware 1340 comprising a set of one or more processor(s) 1342 (which are often Commercial off-the-shelf (COTS) processors) and network interface controller(s) 1344 (NICs; also known as network interface cards) (which include physical NIs 1346), as well as non-transitory machine readable storage media 1348 having stored therein centralized control plane (CCP) software 1350), according to some embodiments of the invention.

Similar to the network device implementations, the electronic device(s) running the centralized control plane 1276, and thus the network controller 1278 including the centralized reachability and forwarding information module 1279, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 13 illustrates, a general purpose control plane device 1304 including hardware 1340 comprising a set of one or more processor(s) 1342 (which are often COTS processors) and network interface controller(s) 1344 (NICs; also known as network interface cards) (which include physical NIs 1346), as well as non-transitory machine readable storage media 1348 having stored therein centralized control plane (CCP) software 1350.

In embodiments that use compute virtualization, the processor(s) 1342 typically execute software to instantiate a hypervisor 1354 (sometimes referred to as a virtual machine monitor (WM)) and one or more virtual machines 1362A-R that are run by the hypervisor 1354; which are collectively referred to as software instance(s) 1352. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 1350 (illustrated as CCP instance 1376A) on top of an operating system 1364A are typically executed within the virtual machine 1362A. In embodiments where compute virtualization is not used, the CCP instance 1376A on top of operating system 1364A is executed on the "bare metal" general purpose control plane device 1304.

The operating system 1364A provides basic processing, input/output (I/O), and networking capabilities. In some embodiments, the CCP instance 1376A includes a network controller instance 1378. The network controller instance 1378 includes a centralized reachability and forwarding information module instance 1379 (which is a middleware layer providing the context of the network controller 1278 to the operating system 1364A and communicating with the various NEs), and an CCP application layer 1380 (sometimes referred to as an application layer) over the middleware layer (providing the intelligence required for various network operations such as protocols, network situational awareness, and user-interfaces). At a more abstract level, this CCP application layer 1380 within the centralized control plane 1276 works with virtual network view(s) (logical view(s) of the network) and the middleware layer provides the conversion from the virtual networks to the physical view. The CCP application can encompass the functionality of the PCE 1399 as described herein above. In some embodiments, the centralized reachability and forwarding information module instance 1379 encompasses an aggregation layer (also referred to as or including a LAG module) 1395 that manages the configuration of a set of aggregated links between the network device and an adjacent network device. An IS-IS module 1381 can similarly manage network discovery and routing table management responsibilities and an IS-IS PCR module 1397 can facilitate the interaction with the aggregation layer 1291A such that explicit trees that specify particular links of a LAG can be utilized.

The centralized control plane 1276 transmits relevant messages to the data plane 1280 based on CCP application layer 1380 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDsNEs/VNEs of the data plane 1280 may receive different messages, and thus different forwarding information. The data plane 1280 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 1280, the packet (or a subset of the packet header and content) is typically forwarded to the centralized control plane 1276. The centralized control plane 1276 will then program forwarding table entries into the data plane 1280 to accommodate packets belonging to the flow of the unknown packet. Once a specific forwarding table entry has been programmed into the data plane 1280 by the centralized control plane 1276, the next packet with matching credentials will match that forwarding table entry and take the set of actions associated with that matched entry.

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting. In particular, the process and structures have been primarily described herein above with relation to an example implementation using IS-IS as the IGP, however, one skilled in the art would understand that other IGP, such as OSPF and similar IGP, are compatible with the principles, functions and structures described herein and that alternative embodiments employing these IGPs are within the scope of the embodiments of the invention.

The invention claimed is:

1. A method implemented by a network device for enabling the provisioning of explicit trees in a network by reporting link aggregation group (LAG) configuration information to a path computation element (PCE), the network device implementing a LAG module and an intermediate system intermediate system (IS-IS) module including an IS-IS path control and reservation module (ISIS-PCR), the method comprising:
reporting LAG configuration by the LAG module to the IS-IS module within the network device;
sending a link state protocol data unit (PDU) (LSP) with the LAG configuration in a LAG sub type length value (TLV) by the ISIS-PCR;
receiving, by the IS-IS module, an explicit tree that specifies at least one virtual local area network (VLAN) identifier (VID) to aggregation link of the LAG assignment; and
translating, by the ISIS-PCR module, the explicit tree into a LAG configuration, the LAG configuration specifying a conversation to aggregation link assignment.

2. The method of claim 1, wherein the LAG configuration reported to the IS-IS module includes port information and characteristics of each of the links of the LAG.

3. The method of any of claim 1, wherein the LSP is sent into the network with a LAG sub-type length value (TLV) identifying links of the LAG to enable inclusion of the links in a topology of the network.

4. The method of claim 1, wherein the explicit tree is received from the PCE in another LSP that includes a Topology sub-type length value (TLV) that identifies hops of the explicit tree and a VID to link assignment.

5. The method of claim 1, further comprising:
configuring the LAG by providing the conversation to aggregation link assignment to the aggregation layer.

6. A non-transitory computer readable medium having instructions stored therein defining a method to be implemented by a network device for enabling the provisioning of explicit trees in a network by reporting link aggregation group (LAG) configuration information to a path computation element (PCE), the network device implementing a LAG module and an intermediate system intermediate system (IS-IS) module including an IS-IS path control and reservation module (ISIS-PCR), the instructions when executed by a processor of the network device causing a set of operations to be performed comprising:
reporting LAG configuration by the LAG module to the IS-IS module within the network device;
sending a link state protocol data unit (PDU) (LSP) with the LAG configuration in a LAG sub type length value (TLV) by the ISIS-PCR;

receiving, by the IS-IS module, an explicit tree that specifies at least one virtual local area network (VLAN) identifier (VID) to aggregation link of the LAG assignment; and translating, by the ISIS-PCR module, the explicit tree into a LAG configuration, the LAG configuration specifying a conversation to aggregation link assignment.

7. The non-transitory computer readable medium of claim 6, wherein the LAG configuration reported to the IS-IS module includes port information and characteristics of each of the links of the LAG.

8. The non-transitory computer readable medium of claim 6, wherein the LSP is sent into the network with a LAG sub-type length value (TLV) identifying links of the LAG to enable inclusion of the links in a topology of the network.

9. The non-transitory computer readable medium of claim 6, wherein the explicit tree is received from the PCE in another LSP that includes a Topology sub-type length value (TLV) that identifies hops of the explicit tree and a VID to link assignment.

10. The non-transitory computer readable medium of claim 6, having further instructions stored therein which when executed cause operations to be performed further comprising:

configuring the LAG by providing the conversation to aggregation link assignment to the aggregation layer.

11. A network device to implement a method for enabling the provisioning of explicit trees in a network by reporting link aggregation group (LAG) configuration information to a path computation element (PCE), the network device implementing a LAG module and an intermediate system intermediate system (IS-IS) module including an IS-IS path control and reservation module (ISIS-PCR), the network device comprising:

a non-transitory computer-readable medium having stored therein an intermediate system to intermediate system module including an IS-IS path control and reservation (ISIS-PCR) module and a LAG module; and a processor coupled to the non-transitory computer-readable medium, the processor configured to execute the IS-IS module and the LAG module, the LAG module configured to report LAG configuration by the LAG module to the IS-IS module within the network device, the ISIS-PCR module configured to send a link state protocol data unit (PDU) (LSP) with the LAG configuration in a LAG sub type length value (TLV), the IS-IS module configured to receive an explicit tree that specifies at least one virtual local area network (VLAN) identifier (VID) to aggregation link of the LAG assignment, and the ISIS-PCR module further configured to translate the explicit tree into a LAG configuration, the LAG configuration specifying a conversation to aggregation link assignment.

12. The network device of claim 11, wherein the LAG configuration reported to the IS-IS module includes port information and characteristics of each of the links of the LAG.

13. The network device of claim 11, wherein the LSP is sent into the network with a LAG sub-type length value (TLV) identifying links of the LAG to enable inclusion of the links in a topology of the network.

14. The network device of claim 11, wherein the explicit tree is received from the PCE in another LSP that includes a Topology sub-type length value (TLV) that identifies hops of the explicit tree and a VID to link assignment.

15. The network device of claim 11, wherein the ISIS-PCR module is further configured to configure the LAG by providing the conversation to aggregation link assignment to the aggregation layer.

16. A computing device configured to execute a plurality of virtual machines for implementing network function virtualization (NFV), wherein a virtual machine from the plurality of virtual machines is configured to execute a method for enabling the provisioning of explicit trees in a network by reporting link aggregation group (LAG) configuration information to a path computation element (PCE), the computing device comprising:

a non-transitory computer-readable medium having stored therein an intermediate system to intermediate system module including an IS-IS path control and reservation (ISIS-PCR) module and a LAG module; and a processor coupled to the non-transitory computer-readable medium, the processor configured to execute the virtual machine, the virtual machine to execute the IS-IS module and the LAG module, the LAG module configured to report LAG configuration by the LAG module to the IS-IS module within the network device, the ISIS-PCR module configured to send a link state protocol data unit (PDU) (LSP) with the LAG configuration in a LAG sub type length value (TLV), the IS-IS module configured to receive an explicit tree that specifies at least one virtual local area network (VLAN) identifier (VID) to aggregation link of the LAG assignment, and the ISIS-PCR module further configured to translate the explicit tree into a LAG configuration, the LAG configuration specifying a conversation to aggregation link assignment.

17. The computing device of claim 16, wherein the LAG configuration reported to the IS-IS module includes port information and characteristics of each of the links of the LAG.

18. The computing device of claim 16, wherein the LSP is sent into the network with a LAG sub-type length value (TLV) identifying links of the LAG to enable inclusion of the links in a topology of the network.

19. The computing device of claim 16, wherein the explicit tree is received from the PCE in another LSP that includes a Topology sub-type length value (TLV) that identifies hops of the explicit tree and a VID to link assignment.

20. The computing device of claim 16, wherein the ISIS-PCR module is further configured to configure the LAG by providing the conversation to aggregation link assignment to the aggregation layer.

21. A control plane device to implement a control plane of a software defined networking (SDN) network including a plurality of network devices, the control plane device implementing a method for enabling the provisioning of explicit trees in a network by reporting link aggregation group (LAG) configuration information to a path computation element (PCE), the control plane device comprising:

a non-transitory computer-readable medium having stored therein an intermediate system to intermediate system module including an IS-IS path control and reservation (ISIS-PCR) module and a LAG module; and a processor coupled to the non-transitory computer-readable medium, the processor configured to execute the IS-IS module and the LAG module, the LAG module configured to report LAG configuration by the LAG module to the IS-IS module within the network device, the ISIS-PCR module configured to send a link state protocol data unit (PDU) (LSP) with the LAG configuration in a LAG sub type length value (TLV), the IS-IS module configured to receive an explicit tree that specifies at least one virtual local area network (VLAN) identifier (VID) to aggregation link of the LAG assignment, and the ISIS-PCR module further configured to translate the explicit tree into a LAG configuration, the LAG configuration specifying a conversation to aggregation link assignment.

22. The control plane device of claim 21, wherein the LAG configuration reported to the IS-IS module includes port information and characteristics of each of the links of the LAG.

23. The control plane device of claim 21, wherein the LSP is sent into the network with a LAG sub-type length value (TLV) identifying links of the LAG to enable inclusion of the links in a topology of the network.

24. The control plane device of claim 21, wherein the explicit tree is received from the PCE in another LSP that includes a Topology sub-type length value (TLV) that identifies hops of the explicit tree and a VID to link assignment.

25. The control plane device of claim 21, wherein the ISIS-PCR module is further configured to configure the LAG by providing the conversation to aggregation link assignment to the aggregation layer.

* * * * *